(12) United States Patent
Kanaya et al.

(10) Patent No.: US 7,296,883 B2
(45) Date of Patent: Nov. 20, 2007

(54) INK COMPOSITION FOR INK-JET RECORDING, RECORDING METHOD USING SAME, AND RECORD

(75) Inventors: Miharu Kanaya, Nagano-ken (JP); Jun Ito, Nagano-ken (JP); Masayuki Momose, Nagano-ken (JP); Toshihiro Yoshimura, Chiba-ken (JP); Akihiro Yamazaki, Chiba-ken (JP); Tadashi Ishida, Chiba-ken (JP)

(73) Assignee: Seiko Epson Corporation, Tokyo (JP)

( * ) Notice: Subject to any disclaimer, the term of this patent is extended or adjusted under 35 U.S.C. 154(b) by 189 days.

(21) Appl. No.: 10/488,727

(22) PCT Filed: Sep. 24, 2003

(86) PCT No.: PCT/JP03/12164

§ 371 (c)(1),
(2), (4) Date: Sep. 3, 2004

(87) PCT Pub. No.: WO2004/029164

PCT Pub. Date: Apr. 8, 2004

(65) Prior Publication Data

US 2005/0007432 A1    Jan. 13, 2005

(30) Foreign Application Priority Data

Sep. 24, 2002 (JP) .............................. 2002/278014
Sep. 24, 2002 (JP) .............................. 2002/278017
Sep. 24, 2002 (JP) .............................. 2002/278025

(51) Int. Cl.
G01D 11/00 (2006.01)

(52) U.S. Cl. ...................... 347/100; 347/95; 106/31.6; 523/160

(58) Field of Classification Search ................ 347/100, 347/95, 96, 101; 523/160; 106/31.6, 31.27, 106/31.13
See application file for complete search history.

(56) References Cited

U.S. PATENT DOCUMENTS

| 5,889,085 | A  | 3/1999  | Fukuda et al. |
| 6,153,001 | A  | 11/2000 | Suzuki et al. |
| 6,271,285 | B1 | 8/2001  | Miyabayashi et al. |
| 6,398,356 | B1 | 6/2002  | Fukuda et al. |
| 6,590,012 | B2 | 7/2003  | Miyabayashi |
| 6,737,449 | B1 | 5/2004  | Yatake |
| 2002/0058729 | A1 | 5/2002 | Oshima |
| 2002/0169232 | A1 | 11/2002 | Yatake |
| 2003/0106462 | A1 | 6/2003 | Yatake et al. |
| 2005/0007432 | A1 | 1/2005 | Kanaya et al. |

FOREIGN PATENT DOCUMENTS

| EP | 0 761 783 | 3/1997 |
| EP | 0761783 | 3/1997 |
| EP | 0761783 A2 | 3/1997 |
| EP | 0 947 567 | 10/1999 |
| JP | 61-57669 | 3/1986 |
| JP | 64-006074 | 1/1989 |
| JP | 64-031881 | 2/1989 |
| JP | 01-217088 | 8/1989 |
| JP | 01-254778 | * 10/1989 |
| JP | 5-1254 | 1/1993 |
| JP | 7-34017 | 2/1995 |
| JP | 08-003498 | 1/1996 |
| JP | 9-87560 | 3/1997 |
| JP | 10-17801 | 1/1998 |
| JP | 10-095941 | 4/1998 |
| JP | 10-110127 | 4/1998 |
| JP | 10-120958 | 5/1998 |
| JP | 10-140057 | 5/1998 |
| JP | 10-204346 | 8/1998 |
| JP | 10-287837 | 10/1998 |
| JP | 10-292141 | 11/1998 |
| JP | 11-12519 | 1/1999 |
| JP | 11-29732 | 2/1999 |
| JP | 11/080639 | 3/1999 |
| JP | 11-116863 | 4/1999 |
| JP | 11-181340 | 7/1999 |
| JP | 2000-256570 | 9/2000 |

(Continued)

OTHER PUBLICATIONS

English abstract of JP 2003-171588, dated Jun. 20, 2003.

(Continued)

Primary Examiner—Manish S. Shah
(74) Attorney, Agent, or Firm—Ladas and Parry LLP

(57) ABSTRACT

It is an object of the present invention to provide an ink jet recording ink composition with good reliability and print quality, a high OD value, and good fixability that affords excellent smear resistance. This object is achieved with the present invention by providing ink jet recording ink composition including at least a self-dispersing pigment and two types of resin particles with mutually different properties. The above-mentioned two types of resin particles are two types of resin particles whose glass transition points, average sizes, minimum film-formation temperatures, zeta potentials, and other such properties are mutually different. The present invention also provides a recording method, wherein the above-mentioned ink composition is used to form an image on a recording medium, and provides recorded matter having an image formed on a recording medium using the above-mentioned ink composition.

26 Claims, No Drawings

FOREIGN PATENT DOCUMENTS

| | | |
|---|---|---|
| JP | 2000-351931 | 12/2000 |
| JP | 2001-139856 | 5/2001 |
| JP | 2002-30092 | 1/2002 |
| JP | 2002-60659 | 2/2002 |
| JP | 2002-301857 | 10/2002 |
| JP | 2003-105234 | 4/2003 |
| JP | 2003-171588 | 6/2003 |
| JP | 2003-306624 | 10/2003 |
| WO | 98/21284 | 5/1998 |
| WO | 01/96483 | 12/2001 |
| WO | 03/062331 | 7/2003 |
| WO | 2004/029164 | 4/2004 |

OTHER PUBLICATIONS

English abstract of JP 2002-301857, dated Oct. 15, 2002.
English abstract of JP 2003-105234, dated Apr. 9, 2003.
English abstract of JP 64-006074, dated Jan. 10, 1989.
English abstract of JP 64-031881, dated Feb. 2, 1989.
English abstract of JP 08-003498, dated Jan. 9, 1996.
English abstract of JP 10-120958, dated May 12, 1998.
English abstract of JP 10-110127, dated Apr. 28, 1998.
English abstract of JP 10-095941, dated Apr. 14, 1998.
English abstract of JP 01-217088, dated Aug. 30, 1989.
English abstract of JP 10-287837, dated Oct. 27, 1998.
English abstract of JP 10-292141, datd Nov. 4, 1998.
English abstract of JP 11-080639, dated Mar. 26, 1999.
English abstract of JP 2000-351931, dated Dec. 19, 2000.
English abstract of WO 98/21284, dated May 22, 1998.
Patent Abstracts of Japan computer English abstract of JP 2002-60659 dated Feb. 26, 2002.
Patent Abstracts of Japan computer English abstract of JP 2000-256570 dated Sep. 19, 2000.
Patent Abstracts of Japan computer English abstract of JP 2003-306624 dated Oct. 31, 2003.
Patent Abstracts of Japan computer English abstract of JP 11-116863 dated Apr. 27, 1999.
Patent Abstracts of Japan computer English abstract of JP 5-1254 dated Jan. 8, 1993.
Patent Abstracts of Japan computer English abstract of JP 7-34017 dated Feb. 3, 1995.
Patent Abstracts of Japan computer English abstract of JP 9-87560 dated Mar. 31, 1997.
Patent Abstracts of Japan computer English abstract of JP 10-140057 dated May 26, 1998.
Patent Abstracts of Japan computer English abstract of JP 10-17801 dated Jan. 20, 1998.
Patent Abstracts of Japan computer English abstract of JP 10-204346 dated Aug. 4, 1998.
Patent Abstracts of Japan computer English abstract of JP 11-181340 dated Jul. 6, 1999.
Patent Abstracts of Japan computer English abstract of JP 61-57669 dated Mar. 24, 1986.

* cited by examiner

US 7,296,883 B2

INK COMPOSITION FOR INK-JET RECORDING, RECORDING METHOD USING SAME, AND RECORD

CROSS-REFERENCES

This invention relates to an ink jet recording ink composition with good reliability and print quality, a high OD value, and good fixability that affords excellent smear resistance.

The present invention also relates to an ink jet recording ink composition that affords good reliability and fixability, produces a recorded image with a high OD value that represents high print quality, and furthermore can impart gloss.

BACKGROUND

Ink jet recording is a printing method in which droplets of ink are sprayed and made to adhere to a recording medium such as paper. The ink used for this purpose is generally produced by dissolving any of various water-soluble dyes in water alone or in both water and a water-soluble organic solvent. The images formed by such inks containing water-soluble dyes are generally held to have poor resistance to water and light.

In contrast, an ink obtained by dispersing a pigment in an aqueous medium has excellent resistance to water and light. For instance, Japanese Laid-Open Patent Applications S64-6074 and S64-31881 propose aqueous pigment inks in which carbon black is dispersed with a surfactant or a polymer dispersant (Patent Documents 1 and 2). With these inks, however, if the colorant content in the ink is increased in order to raise the print density of the recorded matter, this is sometimes accompanied by a sharp increase in ink viscosity as well. Also, an excessively large amount of surfactant or polymer dispersant must be used for the carbon black to be stably dispersed in the ink, which can sometimes lead to a decrease in print stability due to foaming or a decrease in the anti-foaming property of the ink.

To solve these problems, Japanese Laid-Open Patent Applications H8-3498 and H10-120958 have disclosed a self-dispersing carbon black dispersion in which at least a specific amount of surface-activated hydrogen or a salt thereof is introduced to the carbon black surface so that just the carbon black can be dispersed in an aqueous solvent without having to use a surfactant, polymer dispersant, or the like (Patent Documents 3 and 4). Japanese Laid-Open Patent Application H10-110127 discloses a method in which sulfonic acid groups are introduced to the carbon black surface (Patent Document 5). Further, an ink jet ink containing the above-mentioned surface-modified carbon black and a glycol ether has been proposed in Japanese Laid-Open Patent Application H10-95941 (Patent Document 6).

A variety of these so-called self-dispersing pigments that need no dispersant have been developed, each with its own advantages, such as those with which the OD (optical density) value increases when these pigments are used as colorants in inks, or which are easy to handle because the viscosity of the ink has been adjusted to a suitable range, or which do not require that miscibility with dispersants or various added solvents be taken into account. These pigments are generally anionic surface-modified types in which carbonyl groups, carboxyl groups, hydroxyl groups, sulfone groups, ammonium groups, or other such hydrophilic functional groups are bonded, either directly or via alkyl groups, aryl groups, or the like, to the surface of the pigment.

Unfortunately, with an ink jet recording ink composition in which a self-dispersing pigment such as these is used, the OD value is high, but the fixability of the ink to the recording medium (and particularly the fixability of the pigment in the ink) is inadequate, which is a problem in that it results in poor smear resistance.

Also, gloss has in recent years come to be required of images formed on special paper or other such recording media by an ink jet recording ink composition.

Patent Document 1: Japanese Laid-Open Patent Application S64-6074
Patent Document 2: Japanese Laid-Open Patent Application S64-31881
Patent Document 3: Japanese Laid-Open Patent Application H8-3498
Patent Document 4: Japanese Laid-Open Patent Application H10-120958
Patent Document 5: Japanese Laid-Open Patent Application H10-110127
Patent Document 6: Japanese Laid-Open Patent Application H10-95941

It is an object of the present invention to provide an ink jet recording ink composition with good reliability and print quality, a high OD value, and good fixability that affords excellent smear resistance. It is a further object of the present invention to provide an ink jet recording ink composition that can impart gloss.

SUMMARY

As a result of diligent research, the inventors learned that the above-mentioned problems can be solved by an ink composition featuring a self-dispersing pigment and a plurality of types of resin particles having different properties.

The present invention was conceived on the basis of this finding, and provides (1) an ink jet recording ink composition comprising at least a self-dispersing pigment and two types of resin particles with mutually different properties. The "properties" in the phrase "two types of resin particles with mutually different properties" refers to the glass transition point, average size, minimum film-formation temperature, zeta potential, and other intrinsic properties of the resin particles.

The present invention is preferably specified by the items set forth in (1)A to (10)A below.

(1)A An ink jet recording ink composition, comprising at least a self-dispersing pigment, resin particles whose glass transition point is at least 10° C., and resin particles whose glass transition point is 0° C. or lower.

(2)A The ink jet recording ink composition according to (1)A, wherein the weight ratio (former:latter) between the resin particles whose glass transition point is at least 10° C. and the resin particles whose glass transition point is 0° C. or lower is from 1:10 to 10:1.

(3)A The ink jet recording ink composition according to (1)A or (2)A, wherein the resin particles whose glass transition point is at least 10° C. or the resin particles whose glass transition point is 0° C. or lower, or both, are added in the form of an emulsion obtained by the emulsion polymerization of an unsaturated monomer.

(4)A The ink jet recording ink composition according to any of (1)A to (3)A, wherein the self-dispersing pigment is contained in the ink composition in an amount of 2 to 15 wt %.

(5)A The ink jet recording ink composition according to any of (1)A to (4)A, wherein the resin particles whose glass transition point is at least 10° C. are contained in the ink composition in an amount of 0.5 to 5 wt %.

(6)A The ink jet recording ink composition according to any of (1)A to (5)A, wherein the resin particles whose glass transition point is 0° C. or lower are contained in the ink composition in an amount of 0.5 to 10 wt %.

(7)A The ink jet recording ink composition according to any of (1)A to (6)A, wherein the resin particles whose glass transition point is at least 10° C. have a glass transition point of at least 10° C. but no higher than 150° C.

(8)A The ink jet recording ink composition according to any of (1)A to (7)A, wherein the resin particles whose glass transition point is 0° C. or lower have a glass transition point of 0° C. or lower but at least −80° C.

(9)A A recording method, wherein an image is formed on a recording medium by using the ink jet recording ink composition according to any of (1)A to (8)A.

(10)A Recorded matter, comprising an image formed on a recording medium by using the ink jet recording ink composition according to any of (1)A to (8)A.

Also, the present invention is preferably specified by the items set forth in (1)B to (10)B below.

(1)B An ink jet recording ink composition comprising at least a self-dispersing pigment, resin particles is resin particles whose average size is less than 100 nm, and resin particles whose average size is from 100 to 250 nm.

(2)B The ink jet recording ink composition according to (1)B, wherein the weight ratio (former:latter) between the resin particles whose average size is less than 100 nm and the resin particles whose average size is from 100 to 250 nm is from 1:1 to 10:1.

(3)B The ink jet recording ink composition according to (1)B or (2)B, wherein the resin particles whose average size is less than 100 nm or the resin particles whose average size is from 100 to 250 nm, or both, are added in the form of an emulsion obtained by the emulsion polymerization of an unsaturated monomer.

(4)B The ink jet recording ink composition according to any of (1)B to (3)B, wherein the self-dispersing pigment is contained in the ink composition in an amount of 2 to 15 wt %.

(5)B The ink jet recording ink composition according to any of (1)B to (4)B, wherein the resin particles whose average size is less than 100 nm are contained in the ink composition in an amount of 0.1 to 5 wt %.

(6)B The ink jet recording ink composition according to any of (1)B to (5)B, wherein the resin particles whose average size is from 100 to 250 nm are contained in the ink composition in an amount of 0.5 to 5 wt %.

(7)B The ink jet recording ink composition according to any of (1)B to (6)B, wherein the resin particles whose average size is less than 100 nm have an average size of at least 50 nm but less than 100 nm.

(8)B The ink jet recording ink composition according to any of (1)B to (7)B, wherein the resin particles whose average size is from 100 to 250 nm have an average size of at least 100 nm but no more than 200 nm.

(9)B A recording method, wherein an image is formed on a recording medium using the ink jet recording ink composition according to any of (1)B to (8)B.

(10)B Recorded matter, comprising an image formed on a recording medium using the ink jet recording ink composition according to any of (1)B to (8)B.

Further, the present invention is preferably specified by the items set forth in (1)C to (10)C below.

(1)C An ink jet recording ink composition comprising at least a self-dispersing pigment, resin particles is resin particles whose minimum film-formation temperature is at least 20° C., and resin particles whose minimum film-formation temperature is 10° C. or lower.

(2)C The ink jet recording ink composition according to (1)C, wherein the weight ratio (former:latter) between the whose minimum film-formation temperature is at least 20° C. and resin particles whose minimum film-formation temperature is 10° C. or lower is from 1:10 to 10:1.

(3)C The ink jet recording ink composition according to (1)C or (2)C, wherein the whose minimum film-formation temperature is at least 20° C. or the resin particles whose minimum film-formation temperature is 10° C. or lower, or both, are added in the form of an emulsion obtained by the emulsion polymerization of an unsaturated monomer.

(4)C The ink jet recording ink composition according to any of (1)C to (3)C, wherein the self-dispersing pigment is contained in the ink composition in an amount of 2 to 15 wt %.

(5)C The ink jet recording ink composition according to any of (1)C to (4)C, wherein the resin particles whose minimum film-formation temperature is at least 20° C. are contained in the ink composition in an amount of 0.5 to 5 wt %.

(6)C The ink jet recording ink composition according to any of (1)C to (5)C, wherein the resin particles whose minimum film-formation temperature is 10° C. or lower are contained in the ink composition in an amount of 0.5 to 10 wt %.

(7)C The ink jet recording ink composition according to any of (1)C to (6)C, wherein the resin particles whose minimum film-formation temperature is at least 20° C. have a minimum film-formation temperature of at least 20° C. but no higher than 150° C.

(8)C The ink jet recording ink composition according to any of (1)C to (7)C, wherein the resin particles whose minimum film-formation temperature is 10° C. or lower have a minimum film-formation temperature of 5° C. or lower.

(9)C The ink jet recording ink composition according to any of (1)C to (8)C, further comprising an organic solvent whose solubility in water at 25° C. is 10 wt % or less.

(10)C A recording method, wherein an image is formed on a recording medium using the ink jet recording ink composition according to any of (1)C to (9)C.

(11)C Recorded matter, comprising an image formed on a recording medium using the ink jet recording ink composition according to any of (1)C to (9)C.

Further, the present invention is preferably specified by the item set forth below.

The ink jet recording ink composition according to (1) above, wherein the two types of resin particles are resin particles whose zeta potential at a pH of 6 is from 10 to −10 mV, and resin particles whose zeta potential at a pH of 6 is from −20 to −55 mV.

DETAILED DESCRIPTION

The ink jet recording ink composition of the present invention will now be described in detail through preferred embodiments thereof (best modes for carrying out the invention).

EMBODIMENT A

The ink jet recording ink composition in Embodiment A is used as a recording liquid that is discharged in the form of droplets from the printer head of an ink jet printer in order to form a recorded image of text, graphics, etc., on paper or another such recording medium by what is known as ink jet recording. (The ink jet recording ink composition of this Embodiment A will hereinafter also be referred to simply as "the ink composition of Embodiment A.")

The ink composition of Embodiment A comprises at least a self-dispersing pigment, resin particles whose glass transition point is at least 10° C., and resin particles whose glass transition point is 0° C. or lower.

Because the ink composition of Embodiment A is constituted as above, the satisfactory OD value of the image formed of the ink composition resulting from the self-dispersing pigment is maintained while the characteristics of each of the two types of resin particles with different glass transition points (Tg) are taken advantage of, which strikes a good balance between OD value and fixability in the ink composition, while particularly enhancing both the OD value and the fixability. Also, the ink composition of Embodiment A constituted as above affords good reliability, print quality (bleeding, etc.), and smear resistance.

The self-dispersing pigment used in Embodiment A is a pigment that has been treated so as to have on its surface one or more types of functional group (dispersibility-imparting group) selected from the group consisting of —COOH, —CHO, —OH, —SO$_3$H, and salts of these, and that can be uniformly dispersed in an aqueous ink composition without the separate addition of a dispersant. The term "dispersion" as used here refers to a state in which the self-dispersing pigment is stably present in water without any dispersant, and encompasses not only a state of being dispersed, but also a state of being dissolved. An ink composition containing a self-dispersing pigment will have higher dispersion stability and afford a more suitable viscosity of the ink composition as compared to an ordinary ink composition containing a pigment other than a self-dispersing pigment and a dispersant. This allows more pigment to be contained, and permits an image of text, graphics, etc., with excellent color expression to be formed on ordinary paper in particular. Furthermore, with an ink composition containing a self-dispersing pigment, the addition of a penetrant (discussed below) that is effective at enhancing print quality will not lower the fluidity, so print quality can be improved by using such a penetrant.

The pigment that forms the self-dispersing pigment can be the same as that in ordinary ink jet recording ink compositions, examples of which include carbon black, azo lake, insoluble azo pigments, condensed azo pigments, chelate azo pigments, phthalocyanine pigments, perylene pigments, perinone pigments, quinacridone pigments, thioindigo pigments, isoindolinone pigments, quinophthalone pigments, dioxazine pigments, anthraquinone pigments, nitro pigments, nitroso pigments, aniline black, and other such organic pigments, and titanium white, zinc white, lead white, carbon blacks, red iron oxide, vermilion, cadmium red, chrome yellow, ultramarine blue, cobalt blue, cobalt violet, zinc chromate, and other such inorganic pigments. Even pigments which are not listed in the color index can be used if they are dispersible in an aqueous phase. Of these, the use of azo lake, insoluble azo pigments, condensed azo pigments, chelate azo pigments, phthalocyanine pigments, perylene pigments, perinone pigments, quinacridone pigments, thioindigo pigments, isoindolinone pigments, quinophthalone pigments, dioxazine pigments, anthraquinone pigments, and carbon blacks is particularly favorable. By "pigment" is herein meant a granular solid that is usually insoluble in water, other solvents, oils, or the like.

The self-dispersing pigment can be prepared, for example, by coordinating, grafting, or otherwise chemically bonding functional groups or molecules containing functional groups to the surface of the pigment by means of a vacuum plasma or other such physical treatment or a chemical treatment. For instance, this pigment can be obtained by the method described in Japanese Laid-Open Patent Application H8-3498. The self-dispersing pigment can also be a commercially available product, favorable examples of which include Microjet CW1 and CW2 made by Orient Chemical Industries, and CAB-O-JET 200 and 300 made by Cabot.

For example, the self-dispersing pigment can be prepared as follows.

One Method for Preparing Self-dispersing Pigment (Pigment Surface Oxidation Treatment and Sulfonation Treatment)

A pigment is added to a solvent, and this is either dispersed under high-speed shear with a high-speed mixer or the like, or dispersed by impact with a bead mill, jet mill, or the like, which yields a pigment dispersion in the form of a slurry. While this pigment dispersion is being slowly stirred, a treatment agent containing sulfur (such as sulfamic acid, fuming sulfuric acid, chlorosulfuric acid, fluorosulfuric acid, or amidosulfuric acid) is added, the pigment dispersion is heat treated at 60 to 200° C., and the above-mentioned dispersibility-imparting groups are introduced at the pigment surface. The solvent is removed from this pigment dispersion, after which the dispersion is repeatedly washed with water and filtered by ultrafiltration, reverse osmosis, centrifugation, ordinary filtration, or the like to remove the treatment agent containing sulfur and obtain a self-dispersing pigment.

In terms of enhancing ink storage stability and preventing nozzle clogging, the average particle size of the self-dispersing pigment is preferably between 10 and 300 nm, more preferably between 40 and 150 nm.

In terms of obtaining a satisfactory OD value and the liquid stability of the ink composition, the self-dispersing pigment is preferably contained in the ink composition of Embodiment A in an amount of 2 to 15 wt %, and preferably 4 to 10 wt %.

The resin particles whose glass transition point is at least 10° C. (hereinafter also referred to as "high Tg resin particles") used in Embodiment A will not form a film at normal temperature, so the resin remains in the form of a solid or microparticles on the recording medium, preventing the pigment from undesirably penetrating into the recording medium, and this raises the OD value. The glass transition point (Tg) of the high Tg resin particles is thus at least 10° C., but for the effect thereof to be realized more effectively, this point is at least 10° C. but no higher than 150° C., with a range of at least 20° C. but no higher than 150° C. being particularly good.

The resin particles whose glass transition point is 0° C. or lower (hereinafter also referred to as "low Tg resin particles") used in Embodiment A will spread out over the recording medium, and the pigment (the colorant) can be fixed on the recording medium. The glass transition point (Tg) of the low Tg resin particles is thus 0° C. or lower, but for the effect thereof to be realized more effectively, this point is 0° C. or lower but at least –80° C., with a range of –10° C. or lower but at least –80° C. being particularly good.

The glass transition point (Tg) in Embodiment A can be measured by a standard method, such as using a thermal analyzer such as a differential scanning calorimeter (DSC). An example of a thermal analyzer is the SSC5000 made by Seiko Electronics. If the resin is a copolymer, the glass transition point (Tg) can be evaluated as the calculated glass transition point. The glass transition point (Tg) of a copolymer and the method for evaluating the same are as follows. The glass transition point (Tg) of a copolymer having a specific monomer composition can be found by calculating from Fox's equation. With the Fox equation, the Tg of a copolymer is calculated on the basis of the Tg of homopolymers of the monomers making up the copolymer. This is discussed in detail in Bulletin of the American Physical Society, Series 2, Vol. 1, No. 3, p. 123 (1956). The concept of the term "calculated glass transition point" as used in the Specification of the present invention encompasses the glass transition point calculated by Fox's equation. The Tg values for the homopolymers of the various monomers that serve as the basis for calculating the Tg of a copolymer by Fox's equation can be the numerical values listed in Polymer Data Handbook, Basic Edition (edited by the Polymer Society), pp. 525–546, or can be obtained by measurement according to a standard method.

In Embodiment A, examples of resins that can be used as the high Tg resin particles and low Tg resin particles include acrylic resins, urethane resins, epoxy resins, and polyolefin resins, although this list is not intended to be comprehensive. These resins can be used singly or in combinations of two or more types, and the high Tg resin particles and low Tg resin particles may both be from the same family of resins, or resins from different families may be combined, but at least either the high Tg resin particles or the low Tg resin particles are preferably added to the ink composition in the form of an emulsion of resin particles obtained by the emulsion polymerization of an unsaturated monomer (such as what is known as an "acrylic emulsion"). The reason for this is that the dispersal of the resin particles may be inadequate when the resin particles are added to the ink composition in their original form, so using them in the form of an emulsion is preferable in terms of manufacturing an ink composition. From the standpoint of the storage stability of the ink composition, the emulsion is preferably an acrylic emulsion.

An emulsion (such as an acrylic emulsion) of resin particles can be obtained by a known emulsion polymerization method. For instance, it can be obtained by the emulsion polymerization of an unsaturated monomer (such as an unsaturated vinyl monomer) in water and in the presence of a polymerization initiator and a surfactant.

Examples of the unsaturated monomer include those used in standard emulsion polymerization methods, such as acrylic ester monomers, methacrylic ester monomers, aromatic vinyl monomers, vinyl ester monomers, vinylcyan compound monomers, halogenated monomers, olefin monomers, and diene monomers. More specific examples include methyl acrylate, ethyl acrylate, isopropyl acrylate, n-butyl acrylate, isobutyl acrylate, n-amyl acrylate, isoamyl acrylate, n-hexyl acrylate, 2-ethylhexyl acrylate, octyl acrylate, decyl acrylate, dodecyl acrylate, octadecyl acrylate, cyclohexyl acrylate, phenyl acrylate, benzyl acrylate, glycidyl acrylate, and other such acrylic esters; methyl methacrylate, ethyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate, glycidyl methacrylate, and other such methacrylic esters; vinyl acetate and other such vinyl esters; acrylonitrile, methacrylonitrile, and other such vinylcyan compounds; vinylidene chloride, vinyl chloride, and other such halogenated monomers; styrene, α-methylstyrene, vinyltoluene, 4-t-butylstyrene, chlorstyrene, vinylanisol, vinyinaphthalene, and other such aromatic vinyl monomers; ethylene, propylene, and other such olefins; butadiene, chloroprene, and other such dienes; vinyl ether, vinyl ketone, vinylpyrrolidone, and other such vinyl monomers; acrylic acid, methacrylic acid, itaconic acid, fumaric acid, maleic acid, and other such unsaturated carboxylic acids; acrylamide, methacrylamide, N,N'-dimethacrylamide, and other such acrylamides; and 2-hydroxyethyl acrylate, 2-hydroxypropyl acrylate, 2-hydroxyethyl methacrylate, 2-hydroxypropyl methacrylate, and other such hydroxyl group-containing monomers. These can be used singly or in mixtures of two or more types.

A crosslinkable monomer having two or more polymerizable double bonds can also be used. Examples of crosslinkable monomers having two or more polymerizable double bonds include polyethylene glycol diacrylate, triethylene glycol diacrylate, 1,3-butylene glycol diacrylate, 1,4-butylene glycol diacrylate, 1,6-hexanediol diacrylate, neopentyl glycol diacrylate, 1,9-nonanediol diacrylate, polypropylene glycol diacrylate, 2,2'-bis(4-acryloxypropyloxyphenyl)propane, 2,2'-bis(4-acryloxydiethoxyphenyl)propane, and other such diacrylate compounds; trimethylolpropane triacrylate, trimethylolethane triacrylate, tetramethylolmethane triacrylate, and other such triacrylate compounds; ditrimethylol tetraacrylate, tetramethylolmethane tetraacrylate, pentaerythritol tetraacrylate, and other such tetraacrylate compounds; dipentaerythritol hexaacrylate and other such hexaacrylate compounds; ethylene glycol dimethacrylate, diethylene glycol dimethacrylate, triethylene glycol dimethacrylate, polyethylene glycol dimethacrylate, 1,3-butylene glycol dimethacrylate, 1,4-butylene glycol dimethacrylate, 1,6-hexanediol dimethacrylate, neopentyl glycol dimethacrylate, dipropylene glycol dimethacrylate, polypropylene glycol dimethacrylate, polybutylene glycol dimethacrylate, 2,2'-bis(4-methacryloxydiethoxyphenyl)propane, and other such dimethacrylate compounds; trimethylolpropane trimethacrylate, trimethylolethane trimethacrylate, and other such trimethacrylate compounds; and methylenebisacrylamide and divinylbenzene. These can be used singly or in mixtures of two or more types.

In addition to the polymerization initiator and surfactant used in the emulsion polymerization, a chain transfer agent, a neutralizer, or the like may also be used according to standard methods. Particularly favorable as neutralizers are ammonia and inorganic alkali hydroxides such as sodium hydroxide and potassium hydroxide.

In Embodiment A, the high Tg resin particles and the low Tg resin particles may be made into a micropowder and mixed with other components of the ink composition, but preferably the resin particles are mixed with the other components of the ink composition after first being dispersed in an aqueous medium and put into the form of an emulsion (polymer emulsion).

In Embodiment A, the high Tg resin particles are preferably contained in the ink composition of Embodiment A in an amount of 0.5 to 5 wt %, and more preferably 1 to 4 wt %.

Meanwhile, the low Tg resin particles are preferably contained in the ink composition of Embodiment A in an amount of 0.5 to 10 wt %, and more preferably 1 to 6 wt %.

In these preferred ranges for the resin particle content, the upper limit is set from the standpoint of the suitable ink jet properties of the ink composition and of reliability (clogging, discharge stability, etc.), and the lower limit is set from the standpoint of more effectively obtaining the effects of the present invention (high OD value, fixability, etc.).

In terms of striking a good balance between OD value and fixability, the weight ratio (former:latter) between the high Tg resin particles and the low Tg resin particles is preferably from 10/1 to 1/10.

From the standpoint of dispersion stability in the ink composition, the high Tg resin particles and low Tg resin particles preferably have an average size of 50 to 250 nm, and particularly 60 to 200 nm.

Also, the high Tg resin particles and low Tg resin particles can have either a single phase structure or multi-phase structure (core-shell type).

In terms of ink preparation (preparing a uniform ink) and ink stability, the high Tg resin particles and low Tg resin particles are preferably added as an emulsion to the ink composition of Embodiment A.

In Embodiment A, "Resin particles" means that
1) Resin that is insoluble in water being dispersed to particles form in water-based solvent,
2) Resin that is insoluble in water having been dispersed into particles form in water-based solvent, or
3) Dried resin of 2).

Also, the term "emulsion" as used in Embodiment A encompasses a solid/liquid dispersion referred to as a suspension, a dispersion, or a latex.

From the standpoint of increasing the dispersion stability of the self-dispersing pigment, it is preferable for the emulsion to be an anionic type. From the same point of view, when a pigment whose surface is cationic (such as one dispersed with a cation group by a surface treatment) is used, it is preferable for the emulsion to be cationic.

The emulsion is manufactured as follows, for example.

One Method for Manufacturing the Emulsion 100 parts ion exchange water is put into a reaction vessel equipped with a dropping apparatus, a thermometer, water-cooled reflux condenser, and a stirrer, and 0.2 part initiator is added under stirring at a temperature of 70° C. and under a nitrogen atmosphere. A separately prepared monomer solution is added dropwise and subjected to a polymerization reaction to prepare a primary substance. 2 parts of a 10% aqueous solution of polymerization initiator is then added to this primary substance at a temperature of 70° C. and stirred, and then a separately prepared reaction solution is added and stirred to bring about a polymerization reaction and obtain a polymerization reaction product. This polymerization reaction product is neutralized with a neutralizer to adjust the pH to between 8 and 8.5, then filtered with a 0.3 µm filter to remove any coarse particles and obtain an emulsion in which resin particles are dispersed.

The polymerization initiator used here can be the same as those used in ordinary radical polymerization, examples of which include potassium persulfate, ammonium persulfate, hydrogen peroxide, azobisisobutyronitrile, benzoyl peroxide, dibutyl peroxide, peracetic acid, cumene hydroperoxide, t-butyl hydroxyperoxide, and paramenthane hydroxyperoxide. In particular, as noted above, a water-soluble polymerization initiator is preferred when the polymerization reaction is carried out in water.

Examples of the emulsifier used in the polymerization reaction include sodium lauryl sulfate, as well as compounds commonly used as an anionic surfactants, nonionic surfactants, and amphoteric surfactants.

Examples of chain transfer agents that can be used in the polymerization reaction include t-dodecyl mercaptan, n-dodecyl mercaptan, n-octyl mercaptan, xanthogens such as dimethylxanthogen disulfide and diisobutylxanthogen disulfide, dipentene, indene, 1,4-cyclohexadiene, dihydrofuran, and xanthene.

The ink composition of Embodiment A is usually an aqueous ink composition containing water, and preferably ion exchange water, as a solvent.

Organic solvents can also be used together with water as the solvent for the ink composition of Embodiment A. Such organic solvents are preferably miscible with water, enhance penetration of the ink composition into the recording medium, help prevent nozzle clogging, and increase the solubility of the penetrating agent and other such components in the ink composition (described below). Examples include alkyl alcohols having 1 to 4 carbons, such as ethanol, methanol, butanol, propanol, and isopropanol; glycol ethers such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono t-butyl ether, 1-methyl-1-methoxybutanol, propylene glycol monomethyl ether, propylene glycol monoethyl ether, propylene glycol mono-t-butyl ether, propylene glycol mono-n propyl ether, propylene glycol mono-iso-propyl ether, dipropylene glycol monomethyl ether, dipropylene glycol monoethyl ether, dipropylene glycol mono-n-propyl ether, and dipropylene glycol mono-iso-propyl ether; and 2-pyrrolidone, formamide, acetamide, dimethyl sulfoxide, sorbitol, sorbitan, acetin, diacetin, triacetin, and sulfolane. These may be used singly or in combinations of two or more types, preferably in an amount of 0 to 10 wt % in the ink composition of Embodiment A.

In terms of improving print quality, it is preferable for the ink composition of Embodiment A to contain an acetylene glycol-based surfactant. Examples of such acetylene glycol-based surfactants include 2,4,7,9-tetramethyl-5-decyn-4,7-diol, 3,6-dimethyl-4-octyn-3,6-diol, 3,5-dimethyl-1-hexyn-3-ol, and substances formed by adding an average 1 to 30 ethyleneoxy groups or propyleneoxy groups to a plurality of hydroxyl groups in each of the above substances. A commercially available product can also be used as the acetylene glycol-based surfactant, examples of which include Olfin E1010 and Olfin STG (both trade names of Nisshin Chemical). These may be used singly or in combinations of two or more types.

The amount in which the acetylene glycol surfactant is contained in the ink composition of Embodiment A is preferably between 0.1 add 3 wt %, more preferably from 0.5 to 1.5 wt %.

It is preferable for the ink composition of Embodiment A to contain a penetrant in order to further increase fixability to the recording medium and thereby enhance the smear resistance of text, graphics, or other image that is recorded. This penetrant is preferable one or more types selected from the group consisting of diethylene glycol mono-n-butyl ether (DEGmBE), diethylene glycol mono-t-butyl ether (DEGmtBE), triethylene glycol mono-n-butyl ether (TEGmBE), propylene glycol mono-n-butyl ether (PGmBE), dipropylene glycol mono-n-butyl ether (DPGmBE), and compound expressed by General Formula I below, with DEGmBE, TEGmBE, and DPGmBE being particularly favorable. In General Formula I below, m and n indicate presence in the system, while PO and EO may be added in a block or randomly.

RO—(PO)$_m$—(EO)$_n$—H     (I)

(In the formula, R is a $C_4$ to $C_{10}$ alkyl group, PO is a propyleneoxy group, EO is an ethyleneoxy group, $m \geq 1$, $n \geq 0$ and $m+n \leq 20$.)

In terms of improving the penetration and drying speed of the ink composition and thereby effectively preventing the ink from bleeding, the penetrant is preferably contained in the ink composition of Embodiment A in an amount of 1 to 20 wt %, and more preferably 2 to 10 wt %.

Other surfactants besides the above-mentioned acetylene glycol-based surfactant can also be contained in the ink composition of Embodiment A in order to increase the smear resistance of the text, graphics, or other image, just as with the above-mentioned penetrant. Examples of such surfactants include amphoteric surfactants such as lauryl dimethylaminoacetic acid betaine, 2-alkyl-N-carboxymethyl-N-hydroxyethyl imidazolinium betaine, coconut oil fatty acid amide propyl dimethylaminoacetic acid betaine, polyoctylpolyaminoethylglycine, and other imidazoline derivatives; and nonionic surfactants such as polyoxyethylene nonylphenyl ether, polyoxyethylene octylphenyl ether, polyoxyethylene dodecylphenyl ether, polyoxyethylene alkylallyl ether, polyoxyethylene oleyl ether, polyoxyethylene lauryl ether, polyoxyethylene alkyl ether, polyoxyalkylene alkyl ether, and other ether-based types, polyoxyethylene oleic acid, polyoxyethylene oleic ester, polyoxyethylene distearic ester, sorbitan laurate, sorbitan monostearate, sorbitan monooleate, sorbitan sesquioleate, polyoxyethylene monooleate, polyoxyethylene stearate, and other ester-based types, and silicon-based surfactants such as dimethylpolysiloxane, as well as fluorine-based surfactants such as fluoroalkyl esters or perfluoroalkyl carboxylates. These surfactants can be used singly or in combinations of two or more types.

It is also preferable for the ink composition of Embodiment A to contain a water-soluble glycol in order to further improve reliability by preventing nozzle clogging. Examples of such water-soluble glycols include ethylene glycol, diethylene glycol, triethylene glycol, tetraethylene glycol, propylene glycol, dipropylene glycol, tripropylene glycol, polyethylene glycol with a molecular weight of 2000 or less, trimethylene glycol, isobutylene glycol, 1,4-butanediol, 1,3-butanediol, 1,5-pentanediol, 1,2-hexanediol, 1,6-hexanediol, and other such dihydric alcohols, as well as glycerol, mesoerythritol, pentaerythritol, and other such trihydric and higher alcohols. These can be used singly or in combinations of two or more types.

The water-soluble glycol is preferably contained in the ink composition of Embodiment A in an amount of 1 to 30 wt %.

A saccharide or an mildew retardant or preservative can also be added to the ink composition of Embodiment A in order to prevent nozzle clogging, just as with the above-mentioned water-soluble glycol.

Examples of saccharides include glucose, mannose, fructose, ribose, xylose, arabinose, lactose, galactose, aldonic acid, glucitol, maltose, cellobiose, sucrose, trehalose, maltotriose, alginic acid and salts thereof, cyclodextrins, and celluloses. These can be used singly or in combinations of two or more types, preferably in an amount of 0 to 15 wt % in the ink composition of Embodiment A.

Examples of mildew retardants and preservatives include sodium benzoate, sodium pentachlorophenol, sodium 2-pyridinethiol-1-oxide, sodium sorbate, sodium dehydroacetate, and 1,2-dibenzisothiazolin-3-one (Proxel CRL, Proxel BDN, Proxel GXL, Proxel XL-2, and Proxel TN, made by Avecia). These can be used singly or in combinations of two or more type, preferably in an amount of 0.01 to 0.5 wt % in the ink composition of Embodiment A.

In terms of ensuring good reliability (preventing clogging and maintaining discharge stability), it is preferable for the ink composition of Embodiment A to contain a chelating agent such as EDTA, preferably in an amount of 0.01 to 0.5 wt % in the ink composition of Embodiment A.

If the surface of the self-dispersing pigment is anionic, the pH of the ink composition of Embodiment A is preferably from 6 to 11, and more preferably 7 to 10, in terms of raising the print density and maintaining liquid stability. To adjust the pH to within this range, it is preferable to add a pH regulator such as sodium hydroxide, potassium hydroxide, lithium hydroxide, or another such inorganic base, or ammonia, triethanolamine, ethyldiethanolamine, diethylethanolamine, tripropanolamine, or another such tertiary amine having 6 to 10 carbons. The pH regulator can be just one type or a combination of two or more, and is preferably used in an amount of 0.01 to 2 wt % in the ink composition of Embodiment A.

The ink composition of Embodiment A can also contain various other additives as needed, example of which include a surface tension regulator, a viscosity regulator, an antioxidant, a UV absorbent, a defoaming agent, and an oxygen-absorbent, which can be used singly or in combinations of two or more types.

From the standpoint of increasing discharge stability and thereby further enhancing reliability, the ink composition of Embodiment A preferably has a surface tension of 20 to 40 mN/m, and more preferably 25 to 34 mN/m. The above-mentioned surface tension regulator can also be added in order to adjust the surface tension to within the above range. The surface tension of the ink composition is measured according to JIS K 3211.

From the standpoint of increasing discharge stability and thereby further enhancing reliability, the viscosity of the ink composition of Embodiment A at 20° C. is preferably from 2 to 10 mPa·s, and particularly from 3 to 6 mPa·s. One of the above-mentioned viscosity regulators can also be added in order to adjust the viscosity of the ink composition to within the above range. Examples of such viscosity regulators include rosins, alginic acids, polyvinyl alcohol, hydroxypropyl cellulose, carboxymethyl cellulose, hydroxyethyl cellulose, methyl cellulose, polyacrylates, polyvinylpyrrolidone, and gum arabic starch.

The ink composition of Embodiment A can be prepared using a commonly known apparatus such as a ball mill, sand mill, attriter, basket mill, or roll mill. It is preferable to remove any coarse particles in the course of preparing the ink composition of Embodiment A. For example, a mixture (ink) obtained by combining the various components discussed above may be filtered with a metal filter, membrane filter, or other such filter to remove particles of 300 nm or larger. Performing this treatment yields an ink composition of better reliability, that will not clog the nozzle.

The ink composition of Embodiment A is not limited to any particular type of color, etc., and can be used as any of various color compositions (such as cyan, magenta, yellow, light cyan, light magenta, dark yellow, red, green, blue, orange, or violet), black ink compositions, light black ink compositions, and so forth. When it is used, the ink composition of Embodiment A can be used alone, or as an ink set consisting of a plurality of types thereof, or as an ink set consisting of one or more types of the ink composition of Embodiment A and one or more types of other ink composition.

There are no particular restrictions on the recording medium on which an image is formed with the ink composition of Embodiment A, and any of various recording media can be used, such as ordinary paper, ink jet recording paper, plastic, film, or metal.

Also, Embodiment A provides a recording method with which an image is formed on a recording medium by using the above-mentioned ink composition. An example of the recording method of Embodiment A is to discharge droplets of the above-mentioned ink composition by an ink jet recording process and cause these droplets to adhere to the recording medium so as to accomplish printing. When the recording method of Embodiment A is performed, the ink composition can be discharged at a higher level of reliability, the print quality of the formed image is better, and the resulting image has a high OD value, good fixability, and excellent smear resistance.

Embodiment A also provides recorded matter comprising an image formed on a recording medium using the above-mentioned ink composition. The recorded matter of Embodiment A has good print quality, a high OD value, good fixability, and excellent smear resistance.

EMBODIMENT B

The ink composition of Embodiment B comprises at least a self-dispersing pigment, resin particles whose average size is less than 100 nm, and resin particles whose average size is from 100 to 250 nm. (The ink jet recording ink composition of this Embodiment B will hereinafter also be referred to simply as "the ink composition of Embodiment B.")

Unless otherwise specified, those items discussed in detail for Embodiment A above are the same as those for the ink composition of Embodiment B. Therefore, those items discussed in detail for Embodiment A above can be suitably applied to the ink composition of Embodiment B as well.

Because the ink composition of Embodiment B is constituted as above, the satisfactory OD value of the image formed of the ink composition resulting from the self-dispersing pigment is maintained while the characteristics of each of the two types of resin particles with different average sizes are taken advantage of, which improves the reliability of the ink composition, imparts fixability, and also imparts gloss and smear resistance to the recorded image. Also, the ink composition of Embodiment B constituted as above allows an image of good print quality to be formed.

The resin particles whose average size is less than 100 nm used in Embodiment B (hereinafter referred to as "small resin particles") preferably have an average size of at least 50 nm but less than 100 nm, because the OD value of the recorded image will be higher and gloss further increased this way.

Meanwhile, the resin particles whose average size is 100 to 250 nm used in Embodiment B (hereinafter referred to as "large resin particles") preferably have an average size of at least 100 nm but no more than 200 nm, again because the OD value of the recorded image will be higher and gloss further increased this way.

The average particle size can be obtained by particle size measurement using a Microtrac UPA150 (made by Microtrac), or an LPA3100, which is a particle size distribution measurement device (made by Otsuka Electronics).

The average size of the resin particles can be adjusted, for example, by varying the conditions under which the resin particles are synthesized (such as temperature, catalyst, and surfactant) or, if the resin particles are a copolymer, the proportions (addition ratios) of the monomers that form the copolymer.

The resins used for the small resin particles and large resin particles in Embodiment B are preferably types that are insoluble in water or have poor solubility in water, which increases the fixability of the ink composition to the recording medium and allows text, graphics, or other images to be formed with excellent smear resistance on the recording medium.

There are no particular restrictions on the above-mentioned resins, but examples include acrylic resins, urethane resins, epoxy resins, and polyolefin resins. These resins can be used singly or in combinations of two or more. The small resin particles and the large resin particles may both be from the same family of resins, or resins from different families may be combined, but at least either the small resin particles or the large resin particles are preferably added to the ink composition in the form of an emulsion of resin particles obtained by the emulsion polymerization of an unsaturated monomer (known as an "acrylic emulsion"). The reason for this is that the dispersal of the resin particles may be inadequate when the resin particles are added to the ink composition in their original form, so using them in the form of an emulsion is preferable in terms of manufacturing an ink composition. From the standpoint of the storage stability of the ink composition, the emulsion is preferably an acrylic emulsion.

From the standpoint of film formability at normal temperature, the emulsion preferably contains resin particles whose minimum film-formation temperature (MFT) is 20° C. or lower, and more preferably from −5 to 10° C. The MFT of the resin particles in the emulsion can be adjusted to within the above range by a method in which the Tg of the resin particles is adjusted to within the range given above, or a method in which a commercially available MFT depressor is used.

The MFT can be measured with an MFT tester. An example is the MFT tester used in Embodiment C below.

In Embodiment B, the small resin particles are preferably contained in the ink composition of Embodiment B in an amount of 0.1 to 5 wt %, and more preferably 0.5 to 5 wt %.

Meanwhile, the large resin particles are preferably contained in the ink composition of Embodiment B in an amount of 0.5 to 5 wt %, and more preferably 1 to 4 wt %.

In these preferred ranges for the resin particle content, the upper limit is set from the standpoint of the suitable ink jet properties of the ink composition and of reliability (clogging, discharge stability, etc.), and the lower limit is set from the standpoint of more effectively obtaining the effects of Embodiment B (high OD value, fixability, etc.).

In terms of being able to form a recorded image that strikes a good balance between OD value and fixability, the weight ratio (former:latter) between the small resin particles and the large resin particles is preferably from 1/1 to 1/10.

From the standpoint of increasing the OD value and gloss of the recorded image, the small resin particles and large resin particles preferably have a glass transition point (Tg) of −50 to 50° C., and more preferably −30 to 30° C.

There are no particular restrictions on the recording medium on which an image is formed with the ink composition of Embodiment B, and any of various recording media can be used, such as ordinary paper, ink jet recording paper, plastic, film, or metal. With the ink composition of Embodiment B, an image with better gloss can be obtained, particularly when an image is formed on ink jet recording paper.

Also, the ink composition of Embodiment B provides a recording method with which an image is formed on a recording medium by using the above-mentioned ink composition. An example of the recording method of Embodiment B is to discharge droplets of the above-mentioned ink composition by an ink jet recording process and cause these droplets to adhere to the recording medium so as to accomplish printing. When the recording method of Embodiment B is performed, the ink composition can be discharged at a higher level of reliability, the print quality of the formed image is better, and the resulting image has a high OD value, good fixability, excellent smear resistance, and is glossy.

Embodiment B also provides recorded matter comprising an image formed on a recording medium using the above-mentioned ink composition. The recorded matter of Embodiment B has good print quality, a high OD value, good fixability, excellent smear resistance, and is glossy.

The applications of the ink composition of Embodiment B, the details about the self-dispersing pigment, the pigment used, the preparation method, the ability to commercially available products, the average particle size, the content amounts, and so forth, as well as preferred embodiments thereof, are the same as for the ink composition of Embodiment A described above.

Also, regarding the small resin particles and large resin particles, their structure, blend embodiments, type of resin particle emulsion (in a preferred blend embodiment), manufacturing method, manufacturing examples, components used in the manufacture thereof, method for being mixed into the ink composition, and method for measuring the glass transition point (Tg) are the same as those given for the high Tg resin particles and low Tg resin particles used in the ink composition of Embodiment A above.

Furthermore, the other components of the ink composition of Embodiment B, such as water or another solvent, an acetylene glycol surfactant or other surfactant, a penetrant, a water-soluble glycol, a saccharide, a mildew retardant or preservative, a chelating agent, a pH regulator, a surface tension regulator, and a viscosity regulator, as well as other additives and the content amounts thereof, and the method for preparing the ink composition, the type of color, and the favorable ranges for pH value, surface tension, and viscosity, are all the same as those given for the ink composition of Embodiment A above.

EMBODIMENT C

The ink composition of Embodiment B comprises at least a self-dispersing pigment, resin particles whose minimum film-formation temperature (MFT) is at least 20° C., and resin particles whose minimum film-formation temperature (MFT) is 10° C. or lower. (The ink jet recording ink composition of this Embodiment C will hereinafter also be referred to simply as "the ink composition of Embodiment C.")

Because the ink composition of Embodiment C is constituted as above, the satisfactory OD value of the image formed of the ink composition resulting from the self-dispersing pigment is maintained while the characteristics of each of the two types of resin particles with different minimum film-formation temperatures (MFT) (hereinafter also referred to simply as "MFT") are taken advantage of, which strikes a good balance between the OD value and fixability in the ink composition, while also particularly increasing both the OD value and fixability. Also, the ink composition of Embodiment C constituted as above affords good reliability, print quality (bleeding, etc.), and smear resistance.

The resin particles whose MFT is at least 20° C. (hereinafter also referred to as "high MFT resin particles") used in Embodiment C will not form a film at normal temperature, so the resin remains in the form of a solid or microparticles on the recording medium, preventing the pigment from undesirably penetrating into the recording medium, and this raises the OD value. The MFT of the high MFT resin particles is thus at least 20° C., but for the effect thereof to be realized more effectively, the MFT is at least 20° C. but no higher than 150° C., with a range of at least 35° C. but no higher than 130° C. being particularly good.

The resin particles whose MFT is 10° C. or lower (hereinafter also referred to as "low MFT resin particles") used in Embodiment C will spread out over the recording medium, and the pigment (the colorant) can be fixed on the recording medium. The MFT of the low MFT resin particles is thus 10° C. or lower, but for the effect thereof to be realized more effectively, the MFT is preferably 5° C. or lower.

In Embodiment C, the MFT is the value obtained by measuring with a "Film Formation Temperature Tester" (made by Imoto Seisakusho), a "TP-801 MFT Tester" (Made by Tester Sangyo), or another such MFT measurement apparatus. It can also be measured by the method set forth in JIS K 6828-1996. The MFT can also be adjusted, for example, by controlling the Tg (glass transition point) of the resin particles, or, particularly if the resin particles are a copolymer, the proportions (addition ratios) of the monomers that form the copolymer. A film-formation auxiliary can also be added to the high MFT resin particles in order to prepare the low MFT resin particles. This is because adding a film-formation auxiliary lowers the temperature at which the resin particles form a film, that is, the MFT.

Any organic solvent that has affinity with the resin can be used as this film-formation auxiliary, examples of which include methyl cellosolve, ethyl cellosolve, butyl cellosolve, methyl carbitol, ethyl carbitol, butyl carbitol, dipropylene glycol monomethyl ether and other such alkyl ethers, and benzyl alcohol, although this list is not intended to be comprehensive. Commercially available film-formation auxiliaries and organic solvents can also be used, and these may be used singly or in combinations of two or more types.

There are no particular restrictions on the resins used for the high MFT resin particles and low MFT resin particles in Embodiment C, but examples include acrylic resins, urethane resins, epoxy resins, and polyolefin resins. These resins can be used singly or in combinations of two or more. The high MFT resin particles and low MFT resin particles may both be from the same family of resins, or resins from different families may be combined, but at least either the high MFT resin particles or the low MFT resin particles are preferably added to the ink composition in the form of an emulsion of resin particles obtained by the emulsion polymerization of an unsaturated monomer (known as an "acrylic emulsion"). The reason for this is that the dispersal of the resin particles may be inadequate when the resin particles are added to the ink composition in their original form, so using them in the form of an emulsion is preferable in terms of manufacturing an ink composition. From the standpoint of the storage stability of the ink composition, the emulsion is preferably an acrylic emulsion.

In Embodiment C, the high MFT resin particles are preferably contained in the ink composition of Embodiment C in an amount of 0.5 to 5 wt %, and more preferably 1 to 4 wt %.

Meanwhile, the low MFT resin particles are preferably contained in the ink composition of Embodiment C in an amount of 0.5 to 10 wt %, and more preferably 0.5 to 6 wt %.

In these preferred ranges for the resin particle content, the upper limit is set from the standpoint of the suitable ink jet properties of the ink composition and of reliability (clogging, discharge stability, etc.), and the lower limit is set from the standpoint of more effectively obtaining the effects of the present invention (high OD value, fixability, etc.).

In terms of striking a good balance between OD value and fixability, the weight ratio (former:latter) between the high MFT resin particles and the low MFT resin particles is preferably from 10/1 to 1/10.

From the standpoint of dispersion stability in the ink composition, the high MFT resin particles and low MFT resin particles preferably have an average size of 50 to 250 nm, and particularly 60 to 250 nm.

Fixability on the recording medium and glossiness can be further enhanced by combining with an organic solvent whose solubility in water is low.

This organic solvent whose solubility in water is low is preferably an organic solvent whose solubility in water at 25° C. is 10 wt % or less. Resin particles whose MFT is close to room temperature or higher do not readily form a film (or do not form a film at all) at room temperature all by themselves, and therefore play almost no part in fixability. However, if such particles are used together with an organic solvent whose solubility in water at 25° C. is 10 wt % or less, the solvent has the effect of promoting film formation at room temperature, and this, combined with the effect of also using the low MFT resin particles, further increases fixability. This organic solvent also has the effect of swelling the resin particles and making the recording surface smoother, which increases gloss. An organic solvent having a function such as this is generally called a film-formation auxiliary, and the function thereof is surmised to be as follows. An organic solvent whose solubility in water at 25° C. is 10 wt % or less is believed to be present in an aqueous ink composition in a form in which it is incorporated into the domain of the resin particles, which are more highly hydrophobic. If the resin particles are dispersed in an aqueous medium in the form of an aqueous emulsion, then the solvent is incorporated such that it swells the resin particles to a certain extent. Accordingly, the ink composition is more stable, and there is no major decrease in storage stability or discharge stability. When printing is performed by causing this ink composition to adhere to paper or another recording medium, the incorporated organic solvent is released from the resin particle domain by evaporating or by penetrating into the recording medium, which triggers the resin particles into forming a film and smoothes the adhesion of the resin film.

The organic solvent whose solubility in water at 25° C. is 10 wt % or less can be any solvent commonly known as a film-formation auxiliary, specific examples of which include 2,2,4-trimethyl-1,3-pentanediol monoisobutyrate, benzyl alcohol, dibutyl phthalate, ethylene glycol monobutyl ether acetate, and triethylene glycol monobutyl ether acetate. These organic solvents may be used singly, or a mixture of a plurality of types of organic solvent may be used. If there are structural isomers, the solvent may be used in the form of a monomer or as a mixture.

The amount in which the organic solvent whose solubility in water at 25° C. is 10 wt % or less is added will depend on the types of resin particles being combined, but from the standpoints of increasing the film formation promotion effect and increasing the storage stability and discharge stability of the ink composition, a range of 0.1 to 30 wt % with respect to the resin particles is preferable, and a range of 0.1 to 20 wt % is even better.

Embodiment C also provides a recording method with which an image is formed on a recording medium by using the above-mentioned ink composition. An example of the recording method of Embodiment C is to discharge droplets of the above-mentioned ink composition by an ink jet recording process and cause these droplets to adhere to the recording medium so as to accomplish printing. When the recording method of Embodiment C is performed, the ink composition can be discharged at a higher level of reliability, the print quality of the formed image is better, and the resulting image has a high OD value, good fixability, and excellent smear resistance.

Embodiment C also provides recorded matter comprising an image formed on a recording medium using the above-mentioned ink composition. The recorded matter of Embodiment C has good print quality, a high OD value, good fixability, and excellent smear resistance.

The applications of the ink composition of Embodiment C, the details about the self-dispersing pigment, the pigment used, the preparation method, the ability to commercially available products, the average particle size, the content amounts, and so forth, as well as preferred embodiments thereof, are the same as for the ink composition of Embodiment A described above.

Also, regarding the high MFT resin particles and low MFT resin particles, their structure, blend embodiments, type of resin particle emulsion (in a preferred blend embodiment), manufacturing method, manufacturing examples, components used in the manufacture thereof, and method for being mixed into the ink composition are the same as those given for the high Tg resin particles and low Tg resin particles used in the ink composition of Embodiment A above.

Furthermore, the other components of the ink composition of Embodiment C, such as water or another solvent, an acetylene glycol surfactant or other surfactant, a penetrant, a water-soluble glycol, a saccharide, a mildew retardant or preservative, a chelating agent, a pH regulator, a surface tension regulator, and a viscosity regulator, as well as other additives and the content amounts thereof, and the method for preparing the ink composition, the type of color, etc., and the favorable ranges for pH value, surface tension, and viscosity, are all the same as those given for the ink composition of Embodiment A above.

The present invention was described in detail above through three embodiments, but the present invention is not limited to these embodiments, and other embodiments are also possible.

With the ink composition of the present invention, it is possible for the two types of resin particles with mutually different properties to be resin particles whose zeta potential at a pH of 6 is from 10 to −10 mV, and resin particles whose zeta potential at a pH of 6 is from −20 to −55 mV.

"Zeta potential" as used in this Specification is a value measured with a Zetasizer 3000 (made by Malvern).

The effect of the present invention can also be achieved by using two types of resin particles having different zeta potentials, and in particular the present invention provides an ink composition with good dispersion stability, with no clumping or precipitation occurring in the ink composition, and with which a good OD value and fixability on a paper surface can be achieved.

EXAMPLES

The present invention will now be described in further detail through examples and comparative examples, but the present invention is not limited in any way by these examples.

Example A

Pigments, emulsions, organic solvents, and ion exchange water (balance, not shown in Table 1) were mixed and stirred in the amounts given in Table 1 (as the weight percentage of each component versus the total weight of the ink composition). The mixture was filtered through a metal filter with a pore size of 5 μm and deaerated with a vacuum pump, which yielded the ink compositions of Example A (Examples 1 to 6) and Comparative Examples 1 to 4.

TABLE 1

| | Example A | | | | | | | | | |
|---|---|---|---|---|---|---|---|---|---|---|
| | Ex. 1 | Ex. 2 | Ex. 3 | Ex. 4 | Ex. 5 | Ex. 6 | CE 1 | CE 2 | CE 3 | CE 4 |
| Pigment 1 | 5 | | | | | | | | | |
| Pigment 2 | | 6 | 6 | | | | 6 | | | |
| C.I. Pigment Red 122, sulfonated type | | | | 6 | | | | 3 | | |
| C.I. Pigment Yellow 74, sulfonated type | | | | | 5 | | | | 5 | |
| C.I. Pigment Blue 15:3, sulfonated type | | | | | | 4 | | | | 4 |
| Emulsion 1A | 2 | 1 | | | | 1 | | | | |
| Emulsion 2A | | | | 2 | 2 | | | 2 | | |
| Emulsion 3A | | | 4 | | | | | | | |
| Emulsion 4A | 2 | | | | | | 1 | | | |
| Emulsion 5A | | 3 | 1 | 2 | 2 | | | | | |
| Emulsion 6A | | | | | | 2 | | | | 1 |
| TEGmBE | 3 | 3 | 3 | 1 | 1 | 1 | 3 | 1 | 1 | 1 |
| GL | 15 | 10 | 5 | 15 | 15 | 15 | 10 | 15 | 15 | 15 |
| TEG | | 2 | 10 | | 2 | 5 | 2 | 2 | 2 | 2 |
| 1,2-HD | 5 | 5 | 5 | 3 | 3 | 3 | 5 | 3 | 3 | 3 |
| 2P | 2 | | | 2 | 2 | 2 | | 2 | 2 | 2 |
| TPA | 1 | 1 | 1 | 0.1 | 0.1 | 0.1 | 1 | 0.1 | 0.1 | 0.1 |
| Olfin E1010 | 1 | | 1 | 1 | 1 | 1 | | 1 | 1 | 1 |
| Olfin STG | | 0.5 | 0.1 | | | | 0.5 | | | |
| EDTA | 0.02 | 0.05 | 0.02 | 0.02 | 0.02 | 0.02 | 0.05 | 0.02 | 0.02 | 0.02 |
| Proxel XL2 | 0.3 | 0.3 | 0.3 | 0.3 | 0.3 | 0.3 | 0.3 | 0.3 | 0.3 | 0.3 |

[CE: Comparative Example]

In Table 1, pigment 1 is Microjet CW1 (trade name of Orient Chemical Industries; particle size of 110 nm), which is a self-dispersing pigment, and pigment 2 is CAB-O-JET 300 (trade name of Cabot; average particle size of 130 nm), which is also a self-dispersing pigment.

The emulsions listed in Table 1 are all aqueous dispersions of resin particles, where the dispersion medium is water and the dispersed phase is the resin particles. The weight percentages given for the emulsions in Table 1 indicate the concentration of resin particles. The Tg values were measured by differential thermal analysis using an SSC5000 thermal analyzer made by Seiko Electronics.

Details (such as the manufacturing method and the Tg of the resin particles) of the emulsions 1A to 6A in Table 1 are given below.

Method for Manufacturing Emulsion 1A 900 g of ion exchange water and 3 g of sodium lauryl sulfate were charged into a reaction vessel equipped with a stirrer, a reflux condenser, a dropping apparatus, and a thermometer, and the temperature was raised to 70° C. while the atmosphere was replaced with nitrogen under stirring. The internal temperature was held at 70° C., 4 g of potassium persulfate was added as a polymerization initiator, and after this had dissolved, an emulsion previously prepared by stirring and mixing 450 g of ion exchange water, 3 g of sodium lauryl sulfate, 20 g of acrylamide, 130 g of styrene, 780 g of 2-ethylhexyl acrylate, 30 g of methacrylic acid, and 2 g of ethylene glycol dimethacrylate was added dropwise to the reaction solution continuously over a period of 4 hours. Upon completion of the dropping, aging was performed for 3 hours. The aqueous emulsion thus obtained was cooled to room temperature, after which ion exchange water and aqueous ammonia were added to adjust the solids content to 40 wt % and the pH to 8.

The glass transition temperature of the resin particles in the aqueous emulsion thus obtained was −50° C.

Method for Manufacturing Emulsion 2A 900 g of ion exchange water and 3 g of sodium lauryl sulfate were charged into a reaction vessel equipped with a stirrer, a reflux condenser, a dropping apparatus, and a thermometer, and the temperature was raised to 70° C. while the atmosphere was replaced with nitrogen under stirring. The internal temperature was held at 70° C., 4 g of potassium persulfate was added as a polymerization initiator, and after this had dissolved, an emulsion previously prepared by stirring and mixing 450 g of ion exchange water, 3 g of sodium lauryl sulfate, 20 g of acrylamide, 300 g of styrene, 640 g of butyl acrylate, and 30 g of methacrylic acid was added dropwise to the reaction solution continuously over a period of 4 hours. Upon completion of the dropping, aging was performed for 3 hours. The aqueous emulsion thus obtained was cooled to room temperature, after which ion exchange water and a 5% sodium hydroxide aqueous solution were added to adjust the solids content to 40 wt % and the pH to 8.

The glass transition temperature of the resin particles in the aqueous emulsion thus obtained was −15° C.

Method for Manufacturing Emulsion 3A 900 g of ion exchange water and 1 g of sodium lauryl sulfate were charged into a reaction vessel equipped with a stirrer, a reflux condenser, a dropping apparatus, and a thermometer, and the temperature was raised to 70° C. while the atmosphere was replaced with nitrogen under stirring. The internal temperature was held at 70° C., 4 g of potassium persulfate was added as a polymerization initiator, and after this had dissolved, an emulsion previously prepared by stirring and mixing 450 g of ion exchange water, 3 g of sodium lauryl sulfate, 20 g of acrylamide, 365 g of styrene, 545 g of butyl acrylate, and 30 g of methacrylic acid was added dropwise to the reaction solution continuously over a period of 4 hours. Upon completion of the dropping, aging was performed for 3 hours. The aqueous emulsion thus obtained was cooled to room temperature, after which ion exchange water and a sodium hydroxide aqueous solution were added to adjust the solids content to 40 wt % and the pH to 8.

The glass transition temperature of the resin particles in the aqueous emulsion thus obtained was −6° C.

Method for Manufacturing Emulsion 4A 900 g of ion exchange water and 3 g of sodium lauryl sulfate were charged into a reaction vessel equipped with a stirrer, a reflux condenser, a dropping apparatus, and a thermometer, and the temperature was raised to 70° C. while the atmosphere was replaced with nitrogen under stirring. The internal temperature was held at 70° C., 4 g of potassium persulfate was added as a polymerization initiator, and after this had dissolved, an emulsion previously prepared by stirring and mixing 450 g of ion exchange water, 3 g of sodium lauryl sulfate, 20 g of acrylamide, 500 g of styrene, 410 g of butyl acrylate, 30 g of methacrylic acid, and 29 g of ethylene glycol dimethacrylate was added dropwise to the reaction solution continuously over a period of 4 hours. Upon completion of the dropping, aging was performed for 3 hours. The aqueous emulsion thus obtained was cooled to room temperature, after which ion exchange water and aqueous ammonia were added to adjust the solids content to 40 wt % and the pH to 8.

The glass transition temperature of the resin particles in the aqueous emulsion thus obtained was 15° C.

Method for Manufacturing Emulsion 5A 900 g of ion exchange water and 1 g of sodium lauryl sulfate were charged into a reaction vessel equipped with a stirrer, a reflux condenser, a dropping apparatus, and a thermometer, and the temperature was raised to 70° C. while the atmosphere was replaced with nitrogen under stirring. The internal temperature was held at 70° C., 4 g of potassium persulfate was added as a polymerization initiator, and after this had dissolved, an emulsion previously prepared by stirring and mixing 450 g of ion exchange water, 3 g of sodium lauryl sulfate, 20 g of acrylamide, 615 g of styrene, 295 g of butyl acrylate, and 30 g of methacrylic acid was added dropwise to the reaction solution continuously over a period of 4 hours. Upon completion of the dropping, aging was performed for 3 hours. The aqueous emulsion thus obtained was cooled to room temperature, after which ion exchange water and a sodium hydroxide aqueous solution were added to adjust the solids content to 40 wt % and the pH to 8.

The glass transition temperature of the resin particles in the aqueous emulsion thus obtained was 36° C.

Method for Manufacturing Emulsion 6A 900 g of ion exchange water and 3 g of sodium lauryl sulfate were charged into a reaction vessel equipped with a stirrer, a reflux condenser, a dropping apparatus, and a thermometer, and the temperature was raised to 70° C. while the atmosphere was replaced with nitrogen under stirring. The internal temperature was held at 70° C., 4 g of potassium persulfate was added as a polymerization initiator, and after this had dissolved, an emulsion previously prepared by stirring and mixing 450 g of ion exchange water, 3 g of sodium lauryl sulfate, 20 g of acrylamide, 675 g of methyl methacrylate, 235 g of butyl acrylate, and 30 g of methacrylic acid was added dropwise to the reaction solution continuously over a period of 4 hours. Upon completion of the dropping, aging was performed for 3 hours. The aqueous emulsion thus obtained was cooled to room temperature, after which ion exchange water and a sodium hydroxide aqueous solution were added to adjust the solids content to 40 wt % and the pH to 8.

The glass transition temperature of the resin particles in the aqueous emulsion thus obtained was 50° C.

The organic solvents listed in Table 1 are defined below.
TEGmBE: triethylene glycol monobutyl ether
GL: glycerol
TEG: triethylene glycol
1,2-HD: 1,2-hexanediol
2P: 2-pyrrolidone
TPA: tripropanolamine
Olfin E1010: acetylene glycol-based surfactant made by Nisshin Chemical
Olfin STG: acetylene glycol-based surfactant made by Nisshin Chemical
EDTA: sodium dihydrogen ethylenediamine tetraacetate (chelating agent)
Proxel XL2: mildew retardant made by Avecia Using the various ink compositions prepared above, text and solid printing was performed at a resolution of 720 dpi with an EM-930C ink jet printer made by Seiko Epson. The recording media were 5 types of paper comprising Copyplus (made by Hammermill), Xerox 4024 (made by Xerox), Xerox P and Xerox R (both made by Fuji Xerox), and Bright White InkJet Paper made by Seiko Epson. The samples (recorded matter) thus obtained were evaluated by the following tests 1 to 3. In these evaluations the average was taken for the evaluations of the various types of paper. Evaluations were also made according to the following tests 4 to 6.

Test 1: Smear Resistance (Line Marker Resistance)

The sample (recorded matter) was allowed to dry naturally for 24 hours after printing. The printed characters were then rubbed with a water-based yellow fluorescent pen (Zebra Pen 2, registered trademark of Zebra) at a pen pressure of 300 g/15 mm, and the pen was visually examined for any smudge (smear). The result was graded on the basis of the following criteria.

A: No smudge whatsoever when the same portion was rubbed twice
B: No smudge occurred after one rub, but smudge did occur after two rubs
C: Smudge occurred after one rub Test 2: Optical Density (OD Value)

After printing, the sample (recorded matter) was allowed to stand for 1 hour in a standard environment. After this, the optical density of the solid printed portion was measured using a Gretag Densitometer (made by Gretag), and this was graded on the basis of the following criteria.

A: Optical density was at least 1.3
B: Optical density was at least 1.1 but less than 1.3
C: Optical density was less than 1.1

Test 3: Water Resistance

Drops of water were dropped onto the printed portion of the sample (recorded matter), and after drying, the printed image (text and solid printing) was examined visually. The condition was graded on the basis of the following criteria.
A: Water drops left no trace whatsoever
B: Water drops left a slight trace
C: Water drops left considerable marks Test 4: Discharge Stability A pattern of solids and lines was continuously printed with an EM-930C ink jet printer at normal temperature using each of the various ink compositions prepared above. The number of times the printer nozzle had to be cleaned, which was performed in order to restore the printing to normal in the event of missing ink dots or flight deviation, during the printing of 100 pages was counted, and the result was graded on the basis of the following criteria.
A: Zero cleanings
B: One or two cleanings
C: Three or more cleanings Test 5: Storage Stability 50 g of ink composition was put in an aluminum pouch and left for 1 week in a 70° C. environment. At the end of this time, the sample was graded on the basis of the following criteria for whether any foreign matter (precipitate) had been produced, and if none had, how much the properties of the sample (viscosity, surface tension, pH, particle size) had changed.
A: No foreign matter produced, and no change in properties
B: No foreign matter produced, but some change in properties
C: Foreign matter produced Test 6: Clogging The head of an EM-930C ink jet printer was filled with each ink, and after it had been confirmed that the ink composition was being discharged from all the nozzles, the head was left away from its home position (with the head away from the position of the cap provided to the printer), with the ink cartridge removed, for 1 week in a 40° C. environment. At the end of this time, the number of cleanings required until the ink composition was once again discharged from all the nozzles was counted, and a grade was assigned on the basis of the following criteria.
A: One cleaning
B: Two to five cleanings
C: Six or more cleanings The results of the above evaluations are given in Table 2.

TABLE 2

| | Example A | | | | | | | | | |
|---|---|---|---|---|---|---|---|---|---|---|
| | Ex. 1 | Ex. 2 | Ex. 3 | Ex. 4 | Ex. 5 | Ex. 6 | CE 1 | CE 2 | CE 3 | CE 4 |
| Test 1 | A | A | A | A | A | A | C | B | A | C |
| Test 2 | A | A | A | A | A | A | B | C | C | A |
| Test 3 | A | B | A | B | A | A | C | A | A | C |
| Test 4 | A | A | A | A | A | A | A | A | A | A |
| Test 5 | A | A | A | A | A | A | A | A | A | A |
| Test 6 | A | A | B | B | A | A | A | A | A | A |

Example B

Pigments, emulsions, organic solvents, and ion exchange water (balance, not shown in Table 3) were mixed and stirred in the amounts given in Table 3 (as the weight percentage of each component versus the total weight of the ink composition). The mixture was filtered through a metal filter with a pore size of 5 μm and deaerated with a vacuum pump, which yielded the ink compositions of Example B (Examples 1 to 6) and Comparative Examples 1 to 4.

TABLE 3

| | Example B | | | | | | | | | |
|---|---|---|---|---|---|---|---|---|---|---|
| | Ex. 1 | Ex. 2 | Ex. 3 | Ex. 4 | Ex. 5 | Ex. 6 | CE 1 | CE 2 | CE 3 | CE 4 |
| Pigment 1 | 5 | | | | | | | | | |
| Pigment 2 | | 6 | 6 | | | | 6 | | | |
| C.I. Pigment Red 122, sulfonated type | | | | 6 | | | | 3 | | |
| C.I. Pigment Yellow 74, sulfonated type | | | | | 5 | | | | 5 | |
| C.I. Pigment Blue 15:3, sulfonated type | | | | | | 4 | | | | 4 |
| Emulsion 1B | 2 | 4 | | | | 4 | | | | |
| Emulsion 2B | | | 3 | 3 | 2 | | | | | |
| Emulsion 3B | | | 2 | | | | | | | |
| Emulsion 4B | 2 | | | 1 | | | | 1 | | |
| Emulsion 5B | | 0.5 | | | 2 | | | | 2 | |
| Emulsion 6B | | | | | | 1.2 | | | | 1.2 |
| TEGmBE | 3 | 3 | 3 | 1 | 1 | 1 | 3 | 1 | 1 | 1 |
| GL | 15 | 10 | 5 | 15 | 15 | 15 | 10 | 15 | 15 | 15 |
| TEG | | 2 | 10 | | 2 | 5 | 2 | | 2 | 5 |
| 1,2-HD | 5 | 5 | 5 | 3 | 3 | 3 | 5 | 3 | 3 | 3 |
| 2P | 2 | | | 2 | 2 | 2 | | 2 | 2 | 2 |
| TPA | 1 | 1 | 1 | 0.1 | 0.1 | 0.1 | 1 | 0.1 | 0.1 | 0.1 |
| Olfin E1010 | 1 | | 1 | 1 | 1 | 1 | | 1 | 1 | 1 |
| Olfin STG | | 0.5 | 0.1 | | | | 0.5 | | | |
| EDTA | 0.02 | 0.05 | 0.02 | 0.02 | 0.02 | 0.01 | 0.05 | 0.02 | 0.02 | 0.02 |
| Proxel XL2 | 0.3 | 0.3 | 0.3 | 0.3 | 0.3 | 0.3 | 0.3 | 0.3 | 0.3 | 0.3 |

In Table 3, pigment 1 is Microjet CW1 (trade name of Orient Chemical Industries; particle size of 110 nm), which is a self-dispersing pigment, and pigment 2 is CAB-O-JET 300 (trade name of Cabot; average particle size of 130 nm), which is also a self-dispersing pigment.

The emulsions listed in Table 3 are all aqueous dispersions of resin particles, where the dispersion medium is water and the dispersed phase is the resin particles. The weight percentages given for the emulsions in Table 3 indicate the concentration of resin particles. The particle size is the average particle size obtained through particle size distribution measurement with a Microtrac UPA150 (made by Microtrac), and Tg values were measured by differential thermal analysis using an SSC5000 thermal analyzer made by Seiko Electronics.

Details (such as the manufacturing method and the average size of the resin particles) of the emulsions 1 B to 6B in Table 3 are given below.

Method for Manufacturing Emulsion 1B 1000 g of ion exchange water and 7.5 g of sodium lauryl sulfate were charged into a reaction vessel equipped with a stirrer, a reflux condenser, a dropping apparatus, and a thermometer, and the temperature was raised to 70° C. while the atmosphere was replaced with nitrogen under stirring. The internal temperature was held at 70° C., 4 g of potassium persulfate was added as a polymerization initiator, and after this had dissolved, an emulsion previously prepared by stirring and mixing 450 g of ion exchange water, 2 g of sodium lauryl sulfate, 20 g of acrylamide, 300 g of styrene, 400 g of butyl acrylate, and 30 g of methacrylic acid was added dropwise to the reaction solution continuously over a period of 4 hours. Upon completion of the dropping, aging was performed for 3 hours. The aqueous emulsion thus obtained was cooled to room temperature, after which ion exchange water and aqueous ammonia were added to adjust the solids content to 37 wt % and the pH to 8.

The average size of the resin particles in the aqueous emulsion thus obtained was 60 nm.

Method for Manufacturing Emulsion 2B 1000 g of ion exchange water and 2.5 g of sodium lauryl sulfate were charged into a reaction vessel equipped with a stirrer, a reflux condenser, a dropping apparatus, and a thermometer, and the temperature was raised to 70° C. while the atmosphere was replaced with nitrogen under stirring. The internal temperature was held at 70° C., 4 g of potassium persulfate was added as a polymerization initiator, and after this had dissolved, an emulsion previously prepared by stirring and mixing 450 g of ion exchange water, 2 g of sodium lauryl sulfate, 20 g of acrylamide, 300 g of styrene, 640 g of butyl acrylate, 30 g of methacrylic acid, and 2 g of ethylene glycol dimethacrylate was added dropwise to the reaction solution continuously over a period of 4 hours. Upon completion of the dropping, aging was performed for 3 hours. The aqueous emulsion thus obtained was cooled to room temperature, after which ion exchange water and aqueous ammonia were added to adjust the solids content to 38 wt % and the pH to 8.

The average size of the resin particles in the aqueous emulsion thus obtained was 80 nm.

Method for Manufacturing Emulsion 3B 800 g of ion exchange water and 1 g of sodium lauryl sulfate were charged into a reaction vessel equipped with a stirrer, a reflux condenser, a dropping apparatus, and a thermometer, and the temperature was raised to 75° C. while the atmosphere was replaced with nitrogen under stirring. The internal temperature was held at 75° C., 6 g of potassium persulfate was added as a polymerization initiator, and after this had dissolved, an emulsion previously prepared by stirring and mixing 450 g of ion exchange water, 2 g of sodium lauryl sulfate, 20 g of acrylamide, 300 g of methyl methacrylate, 640 g of butyl acrylate, and 30 g of methacrylic acid was added dropwise to the reaction solution continuously over a period of 5 hours. Upon completion of the dropping, aging was performed for 3 hours. The aqueous emulsion thus obtained was cooled to room temperature, after which ion exchange water and a sodium hydroxide aqueous solution were added to adjust the solids content to 40 wt % and the pH to 8.

The average size of the resin particles in the aqueous emulsion thus obtained was 130 nm.

Method for Manufacturing Emulsion 4B 800 g of ion exchange water and 1 g of sodium dodecyl diphenyl ether disulfonate were charged into a reaction vessel equipped with a stirrer, a reflux condenser, a dropping apparatus, and a thermometer, and the temperature was raised to 75° C. while the atmosphere was replaced with nitrogen under stirring. The internal temperature was held at 75° C., 5 g of potassium persulfate was added as a polymerization initiator, and after this had dissolved, an emulsion previously prepared by stirring and mixing 450 g of ion exchange water, 2 g of sodium lauryl sulfate, 20 g of acrylamide, 300 g of styrene, 640 g of butyl acrylate, and 30 g of methacrylic acid was added dropwise to the reaction solution continuously over a period of 4 hours. Upon completion of the dropping, aging was performed for 3 hours. The aqueous emulsion thus obtained was cooled to room temperature, after which ion exchange water and a sodium hydroxide aqueous solution were added to adjust the solids content to 40 wt % and the pH to 8.

The average size of the resin particles in the aqueous emulsion thus obtained was 150 nm.

Method for Manufacturing Emulsion 5B 800 g of ion exchange water and 0.48 g of sodium dodecyl diphenyl ether disulfonate were charged into a reaction vessel equipped with a stirrer, a reflux condenser, a dropping apparatus, and a thermometer, and the temperature was raised to 75° C. while the atmosphere was replaced with nitrogen under stirring. The internal temperature was held at 75° C., 5 g of potassium persulfate was added as a polymerization initiator, and after this had dissolved, an emulsion previously prepared by stirring and mixing 450 g of ion exchange water, 2 g of sodium lauryl sulfate, 20 g of acrylamide, 300 g of styrene, 640 g of butyl acrylate, 30 g of methacrylic acid, and 2 g of ethylene glycol dimethacrylate was added dropwise to the reaction solution continuously over a period of 4 hours. Upon completion of the dropping, aging was performed for 3 hours. The aqueous emulsion thus obtained was cooled to room temperature, after which ion exchange water and a sodium hydroxide aqueous solution were added to adjust the solids content to 40 wt % and the pH to 8.

The average size of the resin particles in the aqueous emulsion thus obtained was 200 nm.

Method for Manufacturing Emulsion 6B 800 g of ion exchange water and 0.29 g of sodium dodecyl diphenyl ether disulfonate were charged into a reaction vessel equipped with a stirrer, a reflux condenser, a dropping apparatus, and a thermometer, and the temperature was raised to 75° C. while the atmosphere was replaced with nitrogen under stirring. The internal temperature was held at 75° C., 9 g of potassium persulfate was added as a polymerization initiator, and after this had dissolved, an emulsion previously prepared by stirring and mixing 450 g of ion exchange water, 2 g of sodium lauryl sulfate, 20 g of acrylamide, 300 g of methyl methacrylate, 640 g of butyl acrylate, 30 g of methacrylic acid, and 2 g of ethylene glycol dimethacrylate was added dropwise to the reaction solution continuously over a period of 5 hours. Upon completion of the dropping, aging was performed for 3 hours. The aqueous emulsion thus obtained was cooled to room temperature, after which ion exchange water and sodium hydroxide aqueous solution were added to adjust the solids content to 40 wt % and the pH to 8.

The average size of the resin particles in the aqueous emulsion thus obtained was 250 nm.

The organic solvents listed in Table 3 are defined below.
TEGmBE: triethylene glycol monobutyl ether
GL: glycerol
TEG: triethylene glycol
1,2-HD: 1,2-hexanediol
2P: 2-pyrrolidone
TPA: tripropanolamine
Olfin E1010: acetylene glycol-based surfactant made by Nisshin Chemical
Olfin STG: acetylene glycol-based surfactant made by Nisshin Chemical
EDTA: sodium dihydrogen ethylenediamine tetraacetate (chelating agent)
Proxel XL2: mildew retardant made by Avecia Using the various ink compositions prepared above, text and solid printing was performed at a resolution of 1440 dpi with an EM-930C ink jet printer made by Seiko Epson. The recording media were 4 types of paper comprising PM photographic paper, MC photographic paper, Photoprint Paper 2 (the above all made by Seiko Epson), and professional photo paper PR-101 (made by Canon). The samples (recorded matter) thus obtained were evaluated by the following tests 1 to 4. In these evaluations the average was taken for the evaluations of the various types of paper. Evaluations were also made according to the following tests 5 to 7.

Test 1: Gloss Evaluation

The regular reflection of the printed portion (30% duty portion) at an angle of 45° was measured with a gloss meter (PG-1M, made by Nippon Denshoku), and the result was graded on the basis of the following criteria.
A: Gloss was at least 60
B: Gloss was at least 50 but less than 60
C: Gloss was less than 50

Test 2: Optical Density (OD Value)

After printing, the sample (recorded matter) was allowed to stand for 1 hour in a standard environment. After this, the optical density of the solid printed portion was measured using a Gretag Densitometer (made by Gretag), and this was graded on the basis of the following criteria.
A: Optical density was at least 2.0
B: Optical density was at least 1.7 but less than 2.0
C: Optical density was less than 1.7

Test 3: Smear Resistance (Line Marker Resistance)

The sample (recorded matter) was allowed to dry naturally for 24 hours after printing. The printed characters were then rubbed with a water-based yellow fluorescent pen (Zebra Pen 2, registered trademark of Zebra) at a pen pressure of 300 g/15 mm, and the pen was visually examined for any smudge. The result was graded on the basis of the following criteria.
A: No smudge whatsoever when the same portion was rubbed twice
B: No smudge occurred after one rub, but smudge did occur after two rubs
C: Smudge occurred after one rub Test 4: Water Resistance Drops of water were dropped onto the printed portion of the sample (recorded matter), and after drying, the printed image (text and solid printing) was examined visually. The condition was graded on the basis of the following criteria.
A: Water drops left no trace whatsoever
B: Water drops left a slight trace
C: Water drops left considerable marks Test 5: Discharge Stability A pattern of solids and lines was continuously printed with an EM-930C ink jet printer at normal temperature using each of the various ink compositions prepared above. The number of times the printer nozzle had to be cleaned, which was performed in order to restore the printing to normal in the event of missing ink dots or flight deviation, during the printing of 100 pages was counted, and the result was graded on the basis of the following criteria.
A: Zero cleanings
B: One or two cleanings
C: Three or more cleanings Test 6: Storage Stability 50 g of ink composition was put in an aluminum pouch and left for 1 week in a 70° C. environment. At the end of this time, the sample was graded on the basis of the following criteria for whether any foreign matter (precipitate) had been produced and, if none had, how much the properties of the sample (viscosity, surface tension, pH, particle size) had changed.
A: No foreign matter produced, and no change in properties
B: No foreign matter produced, but some change in properties
C: Foreign matter produced Test 7: Clogginq The head of an EM-930C ink jet printer was filled with each ink, and after it had been confirmed that the ink composition was being discharged from all the nozzles, the head was left away from its home position (with the head away from the position of the cap provided to the printer), with the ink cartridge removed, for 1 week in a 40° C. environment. At the end of this time, the number of cleanings required until the ink composition was once again discharged from all the nozzles was counted, and a grade was assigned on the basis of the following criteria.
A: One cleaning
B: Two to five cleanings
C: Six or more cleanings The results of the above evaluations are given in Table 4.

TABLE 4

| | Example B | | | | | | | | | |
|---|---|---|---|---|---|---|---|---|---|---|
| | Ex. 1 | Ex. 2 | Ex. 3 | Ex. 4 | Ex. 5 | Ex. 6 | CE 1 | CE 2 | CE 3 | CE 4 |
| Test 1 | B | A | B | A | A | A | C | C | C | C |
| Test 2 | A | A | A | B | B | B | C | C | B | B |
| Test 3 | A | B | A | A | A | B | C | A | B | B |
| Test 4 | A | A | A | A | A | A | A | A | A | A |
| Test 5 | A | A | A | A | B | A | A | A | A | A |
| Test 6 | A | A | A | A | A | A | A | A | A | A |
| Test 7 | A | B | B | A | A | B | A | A | A | A |

Example C

Pigments, emulsions, organic solvents, and ion exchange water (balance, not shown in Table 5) were mixed and stirred in the amounts given in Table 3 (as the weight percentage of each component versus the total weight of the ink composition). The mixture was filtered through a metal filter with a pore size of 5 µm and deaerated with a vacuum pump, which yielded the ink compositions of Example C (Examples 1 to 9) and Comparative Examples 1 to 6.

TABLE 5

|  | Example C |  |  |  |  |  |  |  |  |  |  |  |  |  |  |
|---|---|---|---|---|---|---|---|---|---|---|---|---|---|---|---|
|  | Ex. 1 | Ex. 2 | Ex. 3 | Ex. 4 | Ex. 5 | Ex. 6 | Ex. 7 | Ex. 8 | Ex. 9 | CE 1 | CE 2 | CE 3 | CE 4 | CE 5 | CE 6 |
| Pigment 1 | 5 |  |  | 7 | 7 |  |  |  |  |  |  |  |  |  |  |
| Pigment 2 |  | 6 | 6 |  |  |  |  |  |  | 6 | 6 | 6 |  |  |  |
| C.I. Pigment Red 122, sulfonated type |  |  |  |  |  | 6 | 6 |  |  |  |  |  | 6 |  |  |
| C.I. Pigment Yellow 74, sulfonated type |  |  |  |  |  |  |  | 5 |  |  |  |  |  | 5 |  |
| C.I. Pigment Blue 15:3, sulfonated type |  |  |  |  |  |  |  |  | 4 |  |  |  |  |  | 4 |
| Emulsion 1C | 2 |  |  |  | 1 |  | 1 | 2 |  |  | 2 |  |  | 1 |  |
| Emulsion 2C |  | 0.5 | 0.5 |  |  | 2 |  |  |  |  |  |  |  |  |  |
| Emulsion 3C |  |  |  | 3 | 2 |  |  |  |  |  |  |  |  |  |  |
| Emulsion 4C |  |  |  |  |  | 4 |  |  |  |  |  |  | 4 |  |  |
| Emulsion 5C |  | 4 |  |  |  |  |  |  |  |  |  | 3 | 2 |  |  |
| Emulsion 6C | 2 |  | 4 | 1 | 1 | 2 |  | 3 | 1 |  |  |  |  |  | 1 |
| Benzyl alcohol |  |  |  |  | 0.02 |  | 0.12 |  |  |  |  |  |  |  |  |
| TEGmBE | 3 | 3 | 3 | 1 | 1 | 1 | 1 | 1 | 1 | 3 | 3 | 3 | 1 | 1 | 1 |
| GL | 15 | 10 | 5 | 10 | 10 | 15 | 15 | 15 | 15 | 10 | 10 | 10 | 15 | 15 | 15 |
| TEG |  | 2 | 10 | 5 | 5 |  | 2 | 2 | 5 | 2 | 2 | 2 | 2 | 2 | 5 |
| 1,2-HD | 5 | 5 | 5 | 1 | 1 | 3 | 3 | 3 | 3 | 5 | 5 | 5 | 3 | 3 | 3 |
| 2P | 2 |  |  | 4 | 4 | 2 | 2 | 2 | 2 |  |  |  | 2 | 2 | 2 |
| TPA | 1 | 1 | 1 | 0.5 | 0.5 | 0.1 | 0.1 | 0.1 | 0.1 | 1 | 1 | 1 | 0.1 | 0.1 | 0.1 |
| Olfin E1010 | 1 |  | 1 | 1 | 1 | 1 | 1 | 1 | 1 |  |  |  | 1 | 1 | 1 |
| Olfin STG |  | 0.5 | 0.1 | 0.1 | 0.1 |  |  |  |  | 0.5 | 0.5 | 0.5 |  |  |  |
| EDTA | 0.02 | 0.05 | 0.02 | 0.05 | 0.05 | 0.02 | 0.02 | 0.02 | 0.01 | 0.05 | 0.05 | 0.05 | 0.02 | 0.02 | 0.02 |
| Proxel XL2 | 0.3 | 0.3 | 0.3 | 0.3 | 0.3 | 0.3 | 0.3 | 0.3 | 0.3 | 0.3 | 0.3 | 0.3 | 0.3 | 0.3 | 0.3 |

In Table 5, pigment 1 is Microjet CW1 (trade name of Orient Chemical Industries; particle size of 110 nm), which is a self-dispersing pigment, and pigment 2 is CAB-O-JET 300 (trade name of Cabot; average particle size of 130 nm), which is also a self-dispersing pigment.

The emulsions listed in Table 5 are all aqueous dispersions of resin particles, where the dispersion medium is water and the dispersed phase is the resin particles. The weight percentages given for the emulsions in Table 5 indicate the concentration of resin particles. The MFT values were measured with a Film Formation Temperature Tester made by Imoto Seisakusho, and Tg values were measured by differential thermal analysis using an SSC5000 thermal analyzer made by Seiko Electronics.

Details (such as the manufacturing method and the MFT of the resin particles) of the emulsions 1C to 6C in Table 5 are given below. Because the emulsions freeze at 0° C. and below, the MFT values could not be measured when the MFT of the resin particles was 0° C. or below, so in these cases the MFT is indicated as 0° C. or lower.

Method for Manufacturing Emulsion 1C 900 g of ion exchange water and 3 g of sodium lauryl sulfate were charged into a reaction vessel equipped with a stirrer, a reflux condenser, a dropping apparatus, and a thermometer, and the temperature was raised to 70° C. while the atmosphere was replaced with nitrogen under stirring. The internal temperature was held at 70° C., 4 g of potassium persulfate was added as a polymerization initiator, and after this had dissolved, an emulsion previously prepared by stirring and mixing 450 g of ion exchange water, 3 g of sodium lauryl sulfate, 20 g of acrylamide, 130 g of styrene, 780 g of 2-ethylhexyl acrylate, 30 g of methacrylic acid, and 2 g of ethylene glycol dimethacrylate was added dropwise to the reaction solution continuously over a period of 4 hours. Upon completion of the dropping, aging was performed for 3 hours. The aqueous emulsion thus obtained was cooled to room temperature, after which ion exchange water and aqueous ammonia were added to adjust the solids content to 40 wt % and the pH to 8.

The MFT of the resin particles in the aqueous emulsion thus obtained was 0° C. or lower, and the glass transition temperature was −50° C.

Method for Manufacturing Emulsion 2C 900 g of ion exchange water and 3 g of sodium lauryl sulfate were charged into a reaction vessel equipped with a stirrer, a reflux condenser, a dropping apparatus, and a thermometer, and the temperature was raised to 70° C. while the atmosphere was replaced with nitrogen under stirring. The internal temperature was held at 70° C., 4 g of potassium persulfate was added as a polymerization initiator, and after this had dissolved, an emulsion previously prepared by stirring and mixing 450 g of ion exchange water, 3 g of sodium lauryl sulfate, 20 g of acrylamide, 300 g of styrene, 640 g of butyl acrylate, and 30 g of methacrylic acid was added dropwise to the reaction solution continuously over a period of 4 hours. Upon completion of the dropping, aging was performed for 3 hours. The aqueous emulsion thus obtained was cooled to room temperature, after which ion exchange water and a 5% sodium hydroxide aqueous solution were added to adjust the solids content to 40 wt % and the pH to 8.

The MFT of the resin particles in the aqueous emulsion thus obtained was 0° C. or lower, and the glass transition temperature was −15° C.

Method for Manufacturing Emulsion 3C 900 g of ion exchange water and 1 g of sodium lauryl sulfate were charged into a reaction vessel equipped with a stirrer, a reflux condenser, a dropping apparatus, and a thermometer, and the temperature was raised to 70° C. while the atmosphere was replaced with nitrogen under stirring. The internal temperature was held at 70° C., 4 g of potassium persulfate was added as a polymerization initiator, and after this had dissolved, an emulsion previously prepared by stirring and mixing 450 g of ion exchange water, 3 g of sodium lauryl sulfate, 20 g of acrylamide, 365 g of styrene, 545 g of butyl acrylate, and 30 g of methacrylic acid was added dropwise to the reaction solution continuously over a period of 4 hours. Upon completion of the dropping, aging was performed for 3 hours. The aqueous emulsion thus obtained was cooled to room temperature, after which ion exchange water and a sodium hydroxide aqueous solution were added to adjust the solids content to 40 wt % and the pH to 8.

The MFT of the resin particles in the aqueous emulsion thus obtained was 7° C., and the glass transition temperature was −6° C.

Method for Manufacturing Emulsion 4C 900 g of ion exchange water and 3 g of sodium lauryl sulfate were charged into a reaction vessel equipped with a stirrer, a reflux condenser, a dropping apparatus, and a thermometer, and the temperature was raised to 70° C. while the atmosphere was replaced with nitrogen under stirring. The internal temperature was held at 70° C., 4 g of potassium persulfate was added as a polymerization initiator, and after this had dissolved, an emulsion previously prepared by stirring and mixing 450 g of ion exchange water, 3 g of sodium lauryl sulfate, 20 g of acrylamide, 500 g of styrene, 410 g of butyl acrylate, 30 g of methacrylic acid, and 2 g of ethylene glycol dimethacrylate was added dropwise to the reaction solution continuously over a period of 4 hours. Upon completion of the dropping, aging was performed for 3 hours. The aqueous emulsion thus obtained was cooled to room temperature, after which ion exchange water and a sodium hydroxide aqueous solution were added to adjust the solids content to 40 wt % and the pH to 8.

The MFT of the resin particles in the aqueous emulsion thus obtained was 30° C., and the glass transition temperature was 15° C.

Method for Manufacturing Emulsion 5C 900 g of ion exchange water and 1 g of sodium lauryl sulfate were charged into a reaction vessel equipped with a stirrer, a reflux condenser, a dropping apparatus, and a thermometer, and the temperature was raised to 70° C. while the atmosphere was replaced with nitrogen under stirring. The internal temperature was held at 70° C., 4 g of potassium persulfate was added as a polymerization initiator, and after this had dissolved, an emulsion previously prepared by stirring and mixing 450 g of ion exchange water, 3 g of sodium lauryl sulfate, 20 g of acrylamide, 615 g of styrene, 295 g of butyl acrylate, and 30 g of methacrylic acid was added dropwise to the reaction solution continuously over a period of 4 hours. Upon completion of the dropping, aging was performed for 3 hours. The aqueous emulsion thus obtained was cooled to room temperature, after which ion exchange water and a sodium hydroxide aqueous solution were added to adjust the solids content to 40 wt % and the pH to 8.

The MFT of the resin particles in the aqueous emulsion thus obtained was 48° C., and the glass transition temperature was 36° C.

Method for Manufacturing Emulsion 6C 900 g of ion exchange water and 3 g of sodium lauryl sulfate were charged into a reaction vessel equipped with a stirrer, a reflux condenser, a dropping apparatus, and a thermometer, and the temperature was raised to 70° C. while the atmosphere was replaced with nitrogen under stirring. The internal temperature was held at 70° C., 4 g of potassium persulfate was added as a polymerization initiator, and after this had dissolved, an emulsion previously prepared by stirring and mixing 450 g of ion exchange water, 3 g of sodium lauryl sulfate, 20 g of acrylamide, 675 g of methyl methacrylate, 235 g of butyl acrylate, and 30 g of methacrylic acid was added dropwise to the reaction solution continuously over a period of 4 hours. Upon completion of the dropping, aging was performed for 3 hours. The aqueous emulsion thus obtained was cooled to room temperature, after which ion exchange water and a sodium hydroxide aqueous solution were added to adjust the solids content to 40 wt % and the pH to 8.

The MFT of the resin particles in the aqueous emulsion thus obtained was 59° C., and the glass transition temperature was 50° C.

The organic solvents listed in Table 5 are defined below.

TEGmBE: triethylene glycol monobutyl ether

GL: glycerol

TEG: triethylene glycol 1,2-HD: 1,2-hexanediol

2P: 2-pyrrolidone

TPA: tripropanolamine

Olfin E1010: acetylene glycol-based surfactant made by Nisshin Chemical

Olfin STG: acetylene glycol-based surfactant made by Nisshin Chemical

EDTA: sodium dihydrogen ethylenediamine tetraacetate (chelating agent)

Proxel XL2: mildew retardant made by Avecia

Using the various ink compositions prepared above, text and solid printing was performed at a resolution of 720 dpi with an EM-930C ink jet printer made by Seiko Epson. The recording media were 5 types of paper comprising Copyplus (made by Hammermill), Xerox 4024 (made by Xerox), Xerox P and Xerox R (both made by Fuji Xerox), and Bright White InkJet Paper made by Seiko Epson. The samples (recorded matter) thus obtained were evaluated by the following tests 1 to 3. In these evaluations the average was taken for the evaluations of the various types of paper. Evaluations were also made according to the following tests 4 to 6.

Test 1: Smear Resistance (Line Marker Resistance)

The sample (recorded matter) was allowed to dry naturally for 24 hours after printing. The printed characters were then rubbed with a water-based yellow fluorescent pen (Zebra Pen 2, registered trademark of Zebra) at a pen pressure of 300 g/15 mm, and the pen was visually examined for any smudge. The result was graded on the basis of the following criteria.

A: No smudge whatsoever when the same portion was rubbed twice

B: No smudge occurred after one rub, but smudge did occur after two rubs

C: Smudge occurred after one rub

Test 2: Optical Density (OD Value)

After printing, the sample (recorded matter) was allowed to stand for 1 hour in a standard environment. After this, the optical density of the solid printed portion was measured using a Gretag Densitometer (made by Gretag), and this was graded on the basis of the following criteria.

environment. At the end of this time, the number of cleanings required until the ink composition was once again discharged from all the nozzles was counted, and a grade was assigned on the basis of the following criteria.

A: One cleaning
B: Two to five cleanings
C: Six or more cleanings

The results of the above evaluations are given in Table 6.

TABLE 6

| | Example C | | | | | | | | | | | | | | |
|---|---|---|---|---|---|---|---|---|---|---|---|---|---|---|---|
| | Ex. 1 | Ex. 2 | Ex. 3 | Ex. 4 | Ex. 5 | Ex. 6 | Ex. 7 | Ex. 8 | Ex. 9 | CE 1 | CE 2 | CE 3 | CE 4 | CE 5 | CE 6 |
| Test 1 | A | A | A | B | A | A | B | A | A | C | A | C | C | A | C |
| Test 2 | A | B | A | A | A | B | B | B | A | C | C | B | B | C | A |
| Test 3 | A | A | A | B | A | A | A | A | A | C | A | C | B | A | B |
| Test 4 | A | A | A | A | A | A | A | A | A | A | A | A | A | A | A |
| Test 5 | A | A | A | A | A | A | A | A | A | A | A | A | A | A | A |
| Test 6 | A | A | A | B | A | A | B | A | A | A | A | A | B | A | A |

A: Optical density was at least 1.4
B: Optical density was at least 1.3 but less than 1.4
C: Optical density was at least 1.1 but less than 1.3
D: Optical density was less than 1.1

Test 3: Water Resistance

Drops of water were dropped onto the printed portion of the sample (recorded matter), and after drying, the printed image (text and solid printing) was examined visually. The condition was graded on the basis of the following criteria.

A: Water drops left no trace whatsoever
B: Water drops left a slight trace
C: Water drops left considerable marks Test 4: Discharge Stability A pattern of solids and lines was continuously printed with an EM-930C ink jet printer at normal temperature using each of the various ink compositions prepared above. The number of times the printer nozzle had to be cleaned, which was performed in order to restore the printing to normal in the event of missing ink dots or flight deviation, during the printing of 100 pages was counted, and the result was graded on the basis of the following criteria.

A: Zero cleanings
B: One or two cleanings
C: Three or more cleanings

Test 5: Storage Stability 50 g of ink composition was put in an aluminum pouch and left for 1 week in a 70° C. environment. At the end of this time, the sample was graded on the basis of the following criteria for whether any foreign matter (precipitate) had been produced, and if none had, how much the properties of the sample (viscosity, surface tension, pH, particle size) had changed.

A: No foreign matter produced, and no change in properties
B: No foreign matter produced, but some change in properties
C: Foreign matter produced Test 6: Clogging The head of an EM-930C ink jet printer was filled with each ink, and after it had been confirmed that the ink composition was being discharged from all the nozzles, the head was left away from its home position (with the head away from the position of the cap provided to the printer), with the ink cartridge removed, for 1 week in a 40° C.

Example D

An aqueous emulsion in which the dispersed particles were resin particles was prepared by the following method.

Emulsion 1D 900 g of ion exchange water and 3 g of sodium lauryl sulfate were charged into a reaction vessel equipped with a stirrer, a reflux condenser, a dropping apparatus, and a thermometer, and the temperature was raised to 70° C. while the atmosphere was replaced with nitrogen under stirring. The internal temperature was held at 70° C., 4 g of potassium persulfate was added as a polymerization initiator, and after this had dissolved, an emulsion previously prepared by stirring and mixing 450 g of ion exchange water, 3 g of sodium lauryl sulfate, 20 g of acrylamide, 520 g of styrene, 380 g of butyl acrylate, 30 g of methacrylic acid, and 2 g of ethylene glycol dimethacrylate was added dropwise to the reaction solution continuously over a period of 4 hours. Upon completion of the dropping, aging was performed for 3 hours. The aqueous emulsion thus obtained was cooled to room temperature, after which ion exchange water and aqueous ammonia were added to adjust the solids content to 40 wt % and the pH to 8. The zeta potential of the aqueous emulsion thus obtained was 4 mV.

Emulsion 2D 900 g of ion exchange water and 1 g of sodium lauryl sulfate were charged into a reaction vessel equipped with a stirrer, a reflux condenser, a dropping apparatus, and a thermometer, and the temperature was raised to 70° C. while the atmosphere was replaced with nitrogen under stirring. The internal temperature was held at 70° C., 4 g of potassium persulfate was added as a polymerization initiator, and after this had dissolved, an emulsion previously prepared by stirring and mixing 450 g of ion exchange water, 3 g of sodium lauryl sulfate, 20 g of acrylamide, 615 g of styrene, 295 g of butyl acrylate, and 30 g of methacrylic acid was added dropwise to the reaction solution continuously over a period of 4 hours. Upon completion of the dropping, aging was performed for 3 hours. The aqueous emulsion thus obtained was cooled to room temperature, after which ion exchange water and a sodium hydroxide aqueous solution were added to adjust the solids content to 40 wt % and the pH to 8. The zeta potential of the aqueous emulsion thus obtained was −5 mV.

Emulsion 3D 900 g of ion exchange water and 3 g of sodium lauryl sulfate were charged into a reaction vessel equipped with a stirrer, a reflux condenser, a dropping apparatus, and a thermometer, and the temperature was raised to 70° C. while the atmosphere was replaced with nitrogen under stirring. The internal temperature was held at 70° C., 4 g of potassium persulfate was added as a polymerization initiator, and after this had dissolved, an emulsion previously prepared by stirring and mixing 450 g of ion exchange water, 3 g of sodium lauryl sulfate, 20 g of acrylamide, 675 g of styrene, 235 g of butyl acrylate, and 30 g of methacrylic acid was added dropwise to the reaction solution continuously over a period of 4 hours. Upon completion of the dropping, aging was performed for 3 hours. The aqueous emulsion thus obtained was cooled to room temperature, after which ion exchange water and a sodium hydroxide aqueous solution were added to adjust the solids content to 40 wt % and the pH to 8. The zeta potential of the aqueous emulsion thus obtained was −10 mV.

Emulsion 4D 900 g of ion exchange water and 1 g of sodium lauryl sulfate were charged into a reaction vessel equipped with a stirrer, a reflux condenser, a dropping apparatus, and a thermometer, and the temperature was raised to 70° C. while the atmosphere was replaced with nitrogen under stirring. The internal temperature was held at 70° C., 4 g of potassium persulfate was added as a polymerization initiator, and after this had dissolved, an emulsion previously prepared by stirring and mixing 450 g of ion exchange water, 3 g of sodium lauryl sulfate, 20 g of acrylamide, 365 g of styrene, 545 g of butyl acrylate, and 30 g of methacrylic acid was added dropwise to the reaction solution continuously over a period of 4 hours. Upon completion of the dropping, aging was performed for 3 hours. The aqueous emulsion thus obtained was cooled to room temperature, after which ion exchange water and a sodium hydroxide aqueous solution were added to adjust the solids content to 40 wt % and the pH to 8. The zeta potential of the aqueous emulsion thus obtained was −53 mV.

Emulsion 5D 900 g of ion exchange water and 3 g of sodium lauryl sulfate were charged into a reaction vessel equipped with a stirrer, a reflux condenser, a dropping apparatus, and a thermometer, and the temperature was raised to 70° C. while the atmosphere was replaced with nitrogen under stirring. The internal temperature was held at 70° C., 4 g of potassium persulfate was added as a polymerization initiator, and after this had dissolved, an emulsion previously prepared by stirring and mixing 450 g of ion exchange water, 3 g of sodium lauryl sulfate, 20 g of acrylamide, 300 g of styrene, 640 g of butyl acrylate, and 30 g of methacrylic acid was added dropwise to the reaction solution continuously over a period of 4 hours. Upon completion of the dropping, aging was performed for 3 hours. The aqueous emulsion thus obtained was cooled to room temperature, after which ion exchange water and a 5% sodium hydroxide aqueous solution were added to adjust the solids content to 40 wt % and the pH to 8. The zeta potential of the aqueous emulsion thus obtained was −23 mV.

Emulsion 6D 900 g of ion exchange water and 3 g of sodium lauryl sulfate were charged into a reaction vessel equipped with a stirrer, a reflux condenser, a dropping apparatus, and a thermometer, and the temperature was raised to 70° C. while the atmosphere was replaced with nitrogen under stirring. The internal temperature was held at 70° C., 1 g of potassium persulfate was added as a polymerization initiator, and after this had dissolved, an emulsion previously prepared by stirring and mixing 300 g of ion exchange water, 3 g of sodium lauryl sulfate, 20 g of acrylamide, 310 g of methyl methacrylate, 620 g of butyl acrylate, and 30 g of methacrylic acid was added dropwise to the reaction solution continuously over a period of 4 hours. Upon completion of the dropping, aging was performed for 3 hours. The aqueous emulsion thus obtained was cooled to room temperature, after which ion exchange water and a sodium hydroxide aqueous solution were added to adjust the solids content to 40 wt % and the pH to 8. The zeta potential of the aqueous emulsion thus obtained was −37 mV.

Pigments, emulsions, organic solvents, and ion exchange water (balance, not shown in Table 7) were mixed and stirred in the amounts given in Table 7 (as the weight percentage of each component versus the total weight of the ink composition). The mixture was filtered through a metal filter with a pore size of 5 μm and deaerated with a vacuum pump, which yielded the ink compositions of Example D (Examples 2 to 6) and Comparative Examples 1 to 3.

TABLE 7

| | Example D | | | | | | | |
|---|---|---|---|---|---|---|---|---|
| | Ex. 2 | Ex. 3 | Ex. 4 | Ex. 5 | Ex. 6 | CE 1 | CE 2 | CE 3 |
| Pigment 1 | 6 | | | | | 6 | | |
| Pigment 2 | | 6 | | | | | 6 | |
| C.I. Pigment Red 122, sulfonated type | | | 6 | | | | | 6 |
| C.I. Pigment Yellow 74, sulfonated type | | | | 5 | | | | |
| C.I. Pigment Blue 15:3, sulfonated type | | | | | 4 | | | |
| Emulsion 1D | | | | 1 | | | | |
| Emulsion 2D | | 3 | | | 2 | | | |
| Emulsion 3D | 2 | | 4 | | | | | |
| Emulsion 4D | | | 0.5 | | | | 3 | |
| Emulsion 5D | 2 | 1 | | | 3 | | | |
| Emulsion 6D | | | | 2 | | | | 4 |
| TEGmBE | 3 | 3 | 3 | 1 | 1 | 3 | 3 | 3 |
| GL | 10 | 5 | 10 | 10 | 15 | 10 | 10 | 10 |
| TEG | 2 | 10 | 5 | 5 | 2 | 2 | 2 | 2 |
| 1,2-HD | 5 | 5 | 1 | 3 | 3 | 5 | 5 | 5 |
| 2P | | 4 | 4 | 2 | 2 | | | 2 |
| TPA | 1 | 1 | 0.5 | 0.5 | 0.1 | 1 | 1 | 1 |
| Olfin E1010 | | 1 | 1 | 1 | 1 | | | |
| Olfin STG | 0.5 | 0.1 | 0.1 | 0.1 | | 0.5 | 0.5 | 0.5 |
| EDTA | 0.05 | 0.02 | 0.05 | 0.02 | 0.01 | 0.05 | 0.05 | 0.05 |
| Proxel XL2 | 0.3 | 0.3 | 0.3 | 0.3 | 0.3 | 0.3 | 0.3 | 0.3 |

In Table 7, pigment 1 is Microjet CW1 (trade name of Orient Chemical Industries; particle size of 110 nm), which is a self-dispersing pigment, and pigment 2 is CAB-O-JET 300 (trade name of Cabot; average particle size of 130 nm), which is also a self-dispersing pigment.

The emulsions listed in Table 7 are all aqueous dispersions in which the dispersion medium is water and the dispersed phase is the resin particles. The details thereof are as given above for Emulsions 1D to 6D.

The zeta potential values were measured with a Zetasizer 3000 (made by Malvern).

The organic solvents listed in Table 7 are defined below.
TEGmBE: triethylene glycol monobutyl ether
GL: glycerol
TEG: triethylene glycol 1,2-HD: 1,2-hexanediol 2P: 2-pyrrolidone TPA: tripropanolamine Olfin E1010: acetylene glycol-based surfactant made by Nisshin Chemical Olfin STG: acetylene glycol-based surfactant made by Nisshin Chemical EDTA: sodium dihydrogen ethylenediamine tetraacetate (chelating agent)

Proxel XL2: mildew retardant made by Avecia

Using the various ink compositions prepared above, text and solid printing was performed at a resolution of 720 dpi with an EM-930C ink jet printer made by Seiko Epson. The recording media were 5 types of paper comprising Copyplus (made by Hammermill), Xerox 4024 (made by Xerox), Xerox P and Xerox R (both made by Fuji Xerox), and Bright White InkJet Paper made by Seiko Epson. The samples (recorded matter) thus obtained were evaluated by the following tests 1 to 6.

Test 1: Optical Density (OD Value)

After printing, the sample (recorded matter) was allowed to stand for 1 hour in a standard environment. After this, the optical density of the solid printed portion was measured using a Gretag Densitometer (made by Gretag), and this was graded on the basis of the following criteria.

A: Optical density was at least 1.3

B: Optical density was at least 1.1 but less than 1.3

C: Optical density was less than 1.1

Test 2: Smear Resistance (Line Marker resistance)

The sample (recorded matter) was allowed to dry naturally for 24 hours after printing. The printed characters were then rubbed with a water-based yellow fluorescent pen (Zebra Pen 2, registered trademark of Zebra) at a pen pressure of 300 g/15 mm, and the pen was visually examined for any smudge. The result was graded on the basis of the following criteria.

A: No smudge whatsoever when the same portion was rubbed twice

B: No smudge occurred after one rub, but smudge did occur after two rubs

C: Smudge occurred after one rub

Test 3: Water Resistance

Drops of water were dropped onto the printed portion of the sample (recorded matter), and after drying, the printed image (text and solid printing) was examined visually. The condition was graded on the basis of the following criteria.

A: Water drops left no trace whatsoever

B: Water drops left a slight trace

C: Water drops left considerable marks

Test 4: Discharge Stability

A pattern of solids and lines was continuously printed with an EM-930C ink jet printer at normal temperature using each of the various ink compositions prepared above. The number of times the printer nozzle had to be cleaned, which was performed in order to restore the printing to normal in the event of missing ink dots or flight deviation, during the printing of 100 pages was counted, and the result was graded on the basis of the following criteria.

A: Zero cleanings

B: One or two cleanings

C: Three or more cleanings

Test 5: Storage Stability 50 g of ink composition was put in an aluminum pouch and left for 1 week in a 70° C. environment. At the end of this time, the sample was graded on the basis of the following criteria for whether any foreign matter (precipitate) had been produced, and if none had, how much the properties of the sample (viscosity, surface tension, pH, particle size) had changed.

A: No foreign matter produced, and no change in properties

B: No foreign matter produced, but some change in properties

C: Foreign matter produced

Test 6: Clogging

The head of an EM-930C ink jet printer was filled with each ink, and after it had been confirmed that the ink composition was being discharged from all the nozzles, the head was left away from its home position (with the head away from the position of the cap provided to the printer), with the ink cartridge removed, for 1 week in a 40° C. environment. At the end of this time, the number of cleanings required until the ink composition was once again discharged from all the nozzles was counted, and a grade was assigned on the basis of the following criteria.

A: One cleaning

B: Two to four cleanings

C: Five or more cleanings

The results of the above evaluations are given in Table 8.

TABLE 8

|  | Example D | | | | | | | |
| --- | --- | --- | --- | --- | --- | --- | --- | --- |
|  | Ex. 2 | Ex. 3 | Ex. 4 | Ex. 5 | Ex. 6 | CE 1 | CE 2 | CE 3 |
| Test 1 | A | A | A | A | A | B | C | C |
| Test 2 | A | A | B | A | A | C | B | A |
| Test 3 | A | A | A | A | A | A | B | B |
| Test 4 | A | A | A | A | A | A | B | C |
| Test 5 | A | A | A | A | A | A | A | A |
| Test 6 | A | A | B | A | A | A | C | C |

INDUSTRIAL APPLICABILITY

The present invention provides an ink jet recording ink composition with good reliability and print quality, a high OD value, and good fixability that affords excellent smear resistance. The present invention also provides an ink jet recording ink composition that affords good reliability and fixability, produces a recorded image with a high OD value that represents high print quality, and furthermore can impart gloss and smear resistance.

The ink jet recording ink composition of the present invention affords high reliability because it has excellent discharge stability and storage stability and is good at preventing the clogging of the nozzles in an ink jet recording printer. Also, the ink jet recording ink composition of the present invention yields a recorded image (printed matter) that has good print quality, and in particular has a high OD value and excellent color expression, and furthermore, the good fixability of the recorded image results in excellent smear resistance. Also, the ink jet recording ink composition of the present invention yields a recorded image (printed matter) that has good print quality, and in particular has excellent gloss on glossy media. Furthermore, the ink jet recording ink composition of the present invention yields a recorded image that is resistant to water.

We claim:

1. An ink jet recording ink composition comprising at least a self-dispersing pigment and two types of resin particles with mutually different properties, wherein one of the two types of resin particles is resin particles whose glass transition point is at least 10° C., and the other is resin particles whose glass transition point is 0° C. or lower.

2. The ink jet recording ink composition according to claim 1, wherein the weight ratio (former:latter) between the resin particles whose glass transition point is at least 10° C. and the resin particles whose glass transition point is 0° C. or lower is from 1:10 to 10:1.

3. The ink jet recording ink composition according to claim 1, wherein the resin particles whose glass transition point is at least 10° C. or the resin particles whose glass transition point is 0° C. or lower, or both, are added in the form of an emulsion obtained by the emulsion polymerization of an unsaturated monomer.

4. The ink jet recording ink composition according to claim 1, wherein the resin particles whose glass transition point is at least 10° C. are contained in the ink composition in an amount of 0.5 to 5 wt %.

5. The ink jet recording ink composition according to claim 1, wherein the resin particles whose glass transition point is 0° C. or lower are contained in the ink composition in an amount of 0.5 to 10 wt %.

6. The ink jet recording ink composition according to claim 1, wherein the resin particles whose glass transition point is at least 10° C. have a glass transition point of at least 10° C. but no higher than 150° C.

7. The ink jet recording ink composition according to claim 1, wherein the resin particles whose glass transition point is 0° C. or lower have a glass transition point of 0° C. or lower but at least −80° C.

8. The ink jet recording ink composition according to claim 1, wherein the self-dispersing pigment is contained in the ink composition in an amount of 2 to 15 wt %.

9. A recording method, comprising forming an image on a recording medium with the ink jet recording ink composition according to claim 1.

10. Recorded matter, comprising an image formed on a recording medium using the ink jet recording ink composition according to claim 1.

11. The ink jet recording ink composition according to claim 1, wherein one of the two types of resin particles is resin particle whose average size is less than 100 nm, and the other is resin particles whose average size is from 100 to 250 nm.

12. The ink jet recording ink composition according to claim 11, wherein the weight ratio (former:latter) between the resin particles whose average size is less than 100 nm and the resin particles whose average size is from 100 to 250 nm is from 1:1 to 10:1.

13. The ink jet recording ink composition according to claim 11, wherein the resin particles whose average size is less than 100 nm or the resin particles whose average size is from 100 to 250 nm, or both, are added in the form of an emulsion obtained by the emulsion polymerization of an unsaturated monomer.

14. The ink jet recording ink composition according to claim 11, wherein the resin particles whose average size is less than 100 nm are contained in the ink composition in an amount of 0.1 to 5 wt %.

15. The ink jet recording ink composition according to claim 11, wherein the resin particles whose average size is from 100 to 250 nm are contained in the ink composition in an amount of 0.5 to 5 wt %.

16. The ink jet recording ink composition according to claim 11, wherein the resin particles whose average size is less than 100 nm have an average size of at least 50 nm but less than 100 nm.

17. The ink jet recording ink composition according to claim 11, wherein the resin particles whose average size is from 100 to 250 nm have an average size of at least 100 nm but no more than 200 nm.

18. An ink jet recording ink composition comprising at least a self-dispersing pigment and two types of resin particles with mutually different properties, wherein one of the two types of resin particles is resin particles whose minimum film-formation temperature is at least 20° C., and the other is resin particles whose minimum film-formation temperature is 10° C. or lower.

19. The ink jet recording ink composition according to claim 18, wherein the weight ratio (former:latter) between the resin particles whose minimum film-formation temperature is at least 20° C. and the resin particles whose minimum film-formation temperature is 10° C. or lower is from 1:10 to 10:1.

20. The ink jet recording ink composition according to claim 18, wherein the resin particles whose minimum film-formation temperature is at least 20° C. or the resin particles whose minimum film-formation temperature is 10° C. or lower, or both, are added in the form of an emulsion obtained by the emulsion polymerization of an unsaturated monomer.

21. The ink jet recording ink composition according to claim 18, wherein the resin particles whose minimum film-formation temperature is at least 20° C. are contained in the ink composition in an amount of 0.5 to 5 wt %.

22. The ink jet recording ink composition according to claim 18, wherein the resin particles whose minimum film-formation temperature is 10° C. or lower are contained in the ink composition in an amount of 0.5 to 10 wt %.

23. The ink jet recording ink composition according to claim 18, wherein the resin particles whose minimum film-formation temperature is at least 20° C. have a minimum film-formation temperature of at least 20° C. but no higher than 150° C.

24. The ink jet recording ink composition according to claim 18, wherein the resin particles whose minimum film-formation temperature is 10° C. or lower have a minimum film-formation temperature of 5° C. or lower.

25. The ink jet recording ink composition according to claim 18, further comprising an organic solvent whose solubility in water at 25° C. is 10 wt % or less.

26. An ink jet recording ink composition comprising at least a self-dispersing pigment and two types of resin particles with mutually different properties, wherein the two types of resin particles are resin particles whose zeta potential at a pH of 6 is from 10 to −10 mV, and resin particles whose zeta potential at a pH of 6 is from −20 to −55 mV.

* * * * *